(12) United States Patent
Yampolska et al.

(10) Patent No.: US 10,755,179 B2
(45) Date of Patent: Aug. 25, 2020

(54) METHODS AND APPARATUS FOR IDENTIFYING CONCEPTS CORRESPONDING TO INPUT INFORMATION

(71) Applicant: Primal Fusion Inc., Kitchener (CA)

(72) Inventors: Nadiya Yampolska, Kitchener (CA); Mathew Whitney Wilson, Kitchener (CA); Andrew Russell, Duncan (CA); Ihab Francis Ilyas, Waterloo (CA)

(73) Assignee: PRIMAL FUSION INC., Kitchener, Ontario ( * ) Notice: Subject to any disclaimer, the term of this patent is extended or adjusted under 35 U.S.C. 154(b) by 456 days.

(21) Appl. No.: 14/760,239

(22) PCT Filed: Jan. 13, 2014

(86) PCT No.: PCT/CA2014/000016
§ 371 (c)(1),
(2) Date: Jul. 10, 2015

(87) PCT Pub. No.: WO2014/107801
PCT Pub. Date: Jul. 17, 2014

(65) Prior Publication Data
US 2015/0356202 A1 Dec. 10, 2015

Related U.S. Application Data

(60) Provisional application No. 61/751,571, filed on Jan. 11, 2013, provisional application No. 61/751,594, (Continued)

(51) Int. Cl.
*G06F 16/36* (2019.01)
*G06F 16/955* (2019.01)
(Continued)

(52) U.S. Cl.
CPC ......... *G06N 5/022* (2013.01); *G06F 16/3334* (2019.01); *G06F 16/35* (2019.01);
(Continued)

(58) Field of Classification Search
CPC ........... G06F 17/30663; G06F 17/2705; G06F 17/30705; G06F 17/30722;
(Continued)

(56) References Cited

U.S. PATENT DOCUMENTS

| | | | | | |
|---|---|---|---|---|---|
| 6,044,347 | A | * | 3/2000 | Abella | G10L 15/18 704/272 |
| 8,020,110 | B2 | * | 9/2011 | Hurst | G06F 17/30716 715/762 |

(Continued)

FOREIGN PATENT DOCUMENTS

| | | |
|---|---|---|
| CA | 2 823 406 A1 | 7/2012 |
| CA | 2 823 420 A1 | 7/2012 |

OTHER PUBLICATIONS

International Search Report and Written Opinion for International Application No. PCT/CA2014/000016 dated May 20, 2014.
(Continued)

*Primary Examiner* — Irete F Ehichioya
*Assistant Examiner* — Huen Wong
(74) *Attorney, Agent, or Firm* — Norton Rose Fulbright Canada LLP

(57) ABSTRACT

Techniques for use in identifying one or more concepts in a knowledge representation (KR). The techniques include obtaining user context information associated with a user, wherein the user context information comprises a plurality of words; Also included are semantic disambiguation techniques comprising obtaining user context information associated with a user, wherein the user context information comprises a first portion and a second portion different from
(Continued)

the first portion; and disambiguating between a first and second concept in a knowledge representation (KR) associated with a first meaning of the first portion. Semantic disambiguation techniques further include obtaining user context information associated with a user, wherein the user context information comprises a first portion and a second portion different from the first portion; and disambiguating between a first concept and second concept in a knowledge representation (KR) using a measures of dominance and semantic coherence. Additionally, techniques are disclosed for calculating a measure of semantic coherence based on a graph of a knowledge representation (KR) and, an overlap of semantic context of a first concept and a second concept in the KR.

17 Claims, 10 Drawing Sheets

Related U.S. Application Data filed on Jan. 11, 2013, provisional application No. 61/751,623, filed on Jan. 11, 2013, provisional application No. 61/751,659, filed on Jan. 11, 2013.

(51) Int. Cl.
| | |
|---|---|
| *G06F 16/33* | (2019.01) |
| *G06F 16/901* | (2019.01) |
| *G06Q 30/02* | (2012.01) |
| *G06F 16/38* | (2019.01) |
| *G06F 16/35* | (2019.01) |
| *G06F 40/205* | (2020.01) |
| *G06N 5/02* | (2006.01) |

(52) U.S. Cl.
CPC ............ *G06F 16/367* (2019.01); *G06F 16/38* (2019.01); *G06F 16/9024* (2019.01); *G06F 16/955* (2019.01); *G06F 40/205* (2020.01); *G06Q 30/02* (2013.01)

(58) Field of Classification Search
CPC ......... G06F 17/30734; G06F 17/30876; G06F 17/30958; G06F 16/38; G06F 16/955; G06F 16/367; G06F 16/3334; G06F 16/35; G06F 16/9024; G06F 40/205; G06N 5/022; G06Q 30/02
See application file for complete search history.

(56) References Cited

U.S. PATENT DOCUMENTS

| | | | |
|---|---|---|---|
| 8,606,787 | B1 | 12/2013 | Asgekar et al. |
| 9,235,806 | B2* | 1/2016 | Sweeney ................ G06N 7/005 |
| 9,971,993 | B2 | 5/2018 | Cheng et al. |
| 2004/0054672 | A1* | 3/2004 | Tsuchitani ........ G06F 17/30864 |
| 2004/0220895 | A1 | 11/2004 | Carus et al. |
| 2005/0120030 | A1 | 6/2005 | Varpela et al. |
| 2007/0005621 | A1* | 1/2007 | Lesh .................... G06F 19/322 |
| 2007/0028189 | A1 | 2/2007 | Robbins |
| 2007/0073748 | A1 | 3/2007 | Barney |
| 2007/0109018 | A1* | 5/2007 | Perl ..................... G06F 17/3089 326/41 |
| 2008/0263038 | A1* | 10/2008 | Judge .................. G06F 17/2775 |
| 2009/0222400 | A1* | 9/2009 | Kupershmidt ....... G06N 99/005 706/52 |
| 2009/0307213 | A1 | 12/2009 | Deng et al. |
| 2010/0179759 | A1 | 7/2010 | Zheng et al. |
| 2012/0150874 | A1* | 6/2012 | Sweeney ............. G06F 17/2785 707/749 |
| 2012/0179642 | A1* | 7/2012 | Sweeney ............. G06F 17/2785 706/55 |
| 2013/0007124 | A1* | 1/2013 | Sweeney ............. G06F 17/2785 709/204 |
| 2013/0246328 | A1* | 9/2013 | Sweeney ................ G06N 7/005 706/50 |
| 2013/0290338 | A1 | 10/2013 | Lee et al. |
| 2014/0278138 | A1* | 9/2014 | Barber .................... G06F 19/14 702/19 |
| 2015/0269139 | A1* | 9/2015 | McAteer ............. G06F 17/2785 704/9 |
| 2015/0356418 | A1* | 12/2015 | Yampolska ............ G06Q 30/02 707/739 |
| 2016/0110421 | A1 | 4/2016 | Gallé et al. |
| 2016/0350294 | A1 | 12/2016 | Nefedov et al. |
| 2017/0372204 | A1* | 12/2017 | Sweeney .................. G06N 5/02 |

OTHER PUBLICATIONS

International Preliminary Report on Patentability for International Application No. PCT/CA2014/000016 dated Jul. 23, 2015.
U.S. Appl. No. 14/797,858, filed Jul. 13, 2015, Yampolska et al.
PCT/CA2014/000016, May 20, 2014, International Search Report and Written Opinion.
PCT/CA2014/000016, Jul. 23, 2015, International Preliminary Report on Patentability.
USPTO, Office Action for U.S. Appl. No. 14/797,858 dated Sep. 5, 2018.
CIPO, Office Action for CA Application No. 2897886 dated Jun. 27, 2019.
USPTO, Office Action for U.S. Appl. No. 14/797,858 dated Dec. 19, 2019.

* cited by examiner

| | bank (1) | bank (2) | finance (1) | finance (2) |
|---|---|---|---|---|
| Iteration 1 | 0.334744691607684500 | 0.190255308392315470 | 0.353906250000000003 | 0.121093750000000000 |
| Iteration 2 | 0.294308117280192070 | 0.174443882704860787 | 0.363221412095551030 | 0.168028587904444894 |
| Iteration 3 | 0.309408295655138770 | 0.201531204344486121 | 0.335286589989888875 | 0.153775910010111211 |
| Iteration 4 | 0.292997614734654470 | 0.186299260265345490 | 0.352668487731673150 | 0.168034657266326884 |
| Iteration 5 | 0.304437986039396113 | 0.198589363240038840 | 0.338440603062809650 | 0.158532053187190320 |
| Iteration 6 | 0.295568576221953320 | 0.189666091596554668 | 0.348908498849990870 | 0.165862008962509110 |
| Iteration 7 | 0.302171736088985537 | 0.196406513960821230 | 0.340989812176043740 | 0.160432306954581240 |
| Iteration 8 | 0.297202829442109790 | 0.191363759913358970 | 0.346917281273830980 | 0.164516129370700290 |
| Iteration 9 | 0.300926430639638259 | 0.195148627287015850 | 0.342467825282757650 | 0.161457116733843910 |
| Iteration 10 | 0.298132794467249380 | 0.192310912045201840 | 0.345804260595267310 | 0.163752032892281550 |
| Iteration 11 | 0.300227862282788970 | 0.194439357832872670 | 0.343301714902659650 | 0.162031064981678770 |
| Iteration 12 | 0.298656650822601386 | 0.192843076687239960 | 0.345178586822980140 | 0.163321828263766090 |
| Iteration 13 | 0.299835014705104320 | 0.194040296609955310 | 0.343770920415133410 | 0.162353768269806960 |
| Iteration 14 | 0.298951113182028044 | 0.193142384693424870 | 0.344826668096762770 | 0.163079815389531950 |
| Iteration 15 | 0.298614043468408590 | 0.193815819146314490 | 0.344036348566264377 | 0.162535528075884119 |

FIG. 9

METHODS AND APPARATUS FOR IDENTIFYING CONCEPTS CORRESPONDING TO INPUT INFORMATION

CROSS-REFERENCE TO RELATED APPLICATIONS

This application is a U.S. National Stage application under 35 U.S.C. § 371 based on International Patent Application No. PCT/CA2014/000016, filed Jan. 13, 2014, which claims priority to and the benefit of U.S. Provisional Patent Applications No. 61/751,571, filed Jan. 11, 2013; No. 61/751,594, filed Jan. 11, 2013; No. 61/751,623, filed Jan. 11, 2013; and No. 61/751,659, filed Jan. 11, 2013.

FIELD OF INVENTION

The teachings disclosed herein relate to the field of information retrieval. In particular, the teachings disclosed herein relate to the deployment of methods, in a digital information system environment, for using information associated with a user or users together with one or more data sets expressed as knowledge representations in order to identify and provide information, from a larger set of digital content, that may be of interest to the user(s).

BACKGROUND

Information technology is often used to provide users with various types of information, such as text, audio, video, and any suitable other type of information. In some cases, information is provided to a user in response to an action that the user has taken. For example, information may be provided to a user in response to a search query input by the user or in response to the user's having subscribed to content such as an e-mail alert(s) or an electronic newsletter(s). In other cases, information is provided or "pushed" to a user without the user having specifically requested such information. For example, a user may occasionally be presented with advertisements or solicitations.

There is a vast array of content that can be provided to users via information technology. Indeed, because of the enormous volume of information available via the Internet, the World Wide Web (WWW), and any other suitable information provisioning sources, and because the available information is distributed across an enormous number of independently owned and operated networks and servers, locating information of interest to users presents challenges. Similar challenges exist when the information of interest is distributed across large private networks.

Search engines have been developed to aid users in locating desired content on the Internet. A search engine is a computer program that receives a search query from a user (e.g., in the form of a set of keywords) indicative of content desired by the user, and returns information and/or hyperlinks to information that the search engine determines to be relevant to the user's search query.

Search engines typically work by retrieving a large number of WWW web pages and/or other content using a computer program called a "web crawler" that explores the WWW in an automated fashion (e.g., following every hyperlink that it comes across in each web page that it browses). The located web pages and/or content are analyzed and information about the web pages or content is stored in an index. When a user or an application issues a search query to the search engine, the search engine uses the index to identify the web pages and/or content that it determines to best match the user's search query and returns a list of results with the best-matching web pages and/or content. Frequently, this list is in the form of one or more web pages that include a set of hyperlinks to the web pages and/or content determined to best match the user's search query.

The sheer volume of content accessible via digital information systems presents a number of information retrieval problems. One challenging problem is how to determine what information, in a large set of content, may be of interest to users so that such information may be presented to the users without overwhelming them with irrelevant information. Accordingly, the inventors have recognized the need for techniques for identifying information of interest to users in a large set of content and presenting such content to the users.

SUMMARY

Some embodiments provide for a method for use in identifying one or more concepts in a knowledge representation (KR). The method comprises obtaining user context information associated with a user, wherein the user context information comprises a plurality of words; determining, using at least one processor, whether the user context information corresponds to a single concept in the KR at least in part by determining whether the plurality of words substantially matches a label of a concept in the KR; and when it is determined that the user context information does not correspond to a single concept in the KR: decomposing the user context information into a first plurality of portions; and determining, for each of the first plurality of portions, whether the each portion corresponds to a single concept in the KR.

Other embodiments provide for a system comprising at least one processor configured to perform obtaining user context information associated with a user, wherein the user context information comprises a plurality of words; determining whether the user context information corresponds to a single concept in the KR at least in part by determining whether the plurality of words substantially matches a label of a concept in the KR; and when it is determined that the user context information does not correspond to a single concept in the KR: decomposing the user context information into a first plurality of portions; and determining, for each of the first plurality of portions, whether the each portion corresponds to a single concept in the KR.

Still other embodiments provide for at least one non-transitory computer-readable storage medium storing processor executable instructions that, when executed by at least one processor, cause the at least one processor to perform a method. The method comprises obtaining user context information associated with a user, wherein the user context information comprises a plurality of words; determining whether the user context information corresponds to a single concept in the KR at least in part by determining whether the plurality of words substantially matches a label of a concept in the KR; and when it is determined that the user context information does not correspond to a single concept in the KR: decomposing the user context information into a first plurality of portions; and determining, for each of the first plurality of portions, whether the each portion corresponds to a single concept in the KR.

Some embodiments provide for a method comprising obtaining user context information associated with a user, wherein the user contextinformation comprises a first portion and a second portion different from the first portion; and identifying a first concept associated with a meaning of the first portion from a first group of concepts in a knowledge representation (KR), wherein each concept in the first group of concepts is associated with a different meaning of the first portion, wherein the identifying is performed at least in part by using a graph of the knowledge representation and the second portion.

Other embodiments provide for a system comprising at least one processor configured to perform: obtaining user context information associated with a user, wherein the user contextinformation comprises a first portion and a second portion different from the first portion; and identifying a first concept associated with a meaning of the first portion from a first group of concepts in a knowledge representation (KR), wherein each concept in the first group of concepts is associated with a different meaning of the first portion, wherein the identifying is performed at least in part by using a graph of the knowledge representation and the second portion.

Still other embodiments provide for at least one non-transitory computer-readable storage medium storing processor executable instructions that, when executed by at least one processor, cause the at least one processor to perform a method comprising: obtaining user context information associated with a user, wherein the user context information comprises a first portion and a second portion different from the first portion; and identifying a first concept associated with a meaning of the first portion from a first group of concepts in a knowledge representation (KR), wherein each concept in the first group of concepts is associated with a different meaning of the first portion, wherein the identifying is performed at least in part by using a graph of the knowledge representation, and the second portion.

Still other embodiments provide for a method comprising: obtaining user context information associated with a user, wherein the user context information comprises a first portion and a second portion different from the first portion; an disambiguating between a first concept in a knowledge representation (KR) associated with a first meaning of the first portion and a second concept in the KR associated with a second meaning of the first portion, wherein the disambiguating is performed at least in part by using at least one processor, a graph of the knowledge representation, and the second portion.

Still other embodiments provide for a system comprising at least one processor configured to perform: obtaining user context information associated with a user, wherein the user context information comprises a first portion and a second portion different from the first portion; and disambiguating between a first concept in a knowledge representation (KR) associated with a first meaning of the first portion and a second concept in the KR associated with a second meaning of the first portion, wherein the disambiguating is performed at least in part by using a graph of the knowledge representation and the second portion.

Still other embodiments provide for at least one non-transitory computer-readable storage medium storing processor executable instructions that, when executed by at least one processor, cause the at least one processor to perform a method comprising: obtaining user context information associated with a user, wherein the user context information comprises a first portion and a second portion different from the first portion; and disambiguating between a first concept in a knowledge representation (KR) associated with a first meaning of the first portion and a second concept in the KR associated with a second meaning of the first portion, wherein the disambiguating is performed at least in part by using a graph of the knowledge representation and the second portion.

Some embodiments provide for a method comprising obtaining user context information associated with a user, wherein the user context information comprises a first portion and a second portion different from the first portion; and identifying a first concept associated with a meaning of the first portion from a first group of concepts in a knowledge representation (KR), wherein each concept in the first group of concepts is associated with a different meaning of the first portion, wherein the identifying is performed at least in part by using at least one processor, a measure of dominance of the first concept and a measure of the semantic coherence between the first concept and a second concept in the KR, wherein the second concept is associated with a meaning of the second portion.

Other embodiments provide for a system comprising at least one processor configured to perform obtaining user context information associated with a user, wherein the user context information comprises a first portion and a second portion different from the first portion; and identifying a first concept associated with a meaning of the first portion from a first group of concepts in a knowledge representation (KR), wherein each concept in the first group of concepts is associated with a different meaning of the first portion, wherein the identifying is performed at least in part by using a measure of dominance of the first concept and a measure of the semantic coherence between the first concept and a second concept in the KR, wherein the second concept is associated with a meaning of the second portion.

Still other embodiments provide for at least one non-transitory computer-readable storage medium storing processor executable instructions that, when executed by at least one processor, cause the at least one processor to perform a method comprising: obtaining user context information associated with a user, wherein the user context information comprises a first portion and a second portion different from the first portion; and identifying a first concept associated with a meaning of the first portion from a first group of concepts in a knowledge representation (KR), wherein each concept in the first group of concepts is associated with a different meaning of the first portion, wherein the identifying is performed at least in part by using a measure of dominance of the first concept and a measure of the semantic coherence between the first concept and a second concept in the KR, wherein the second concept is associated with a meaning of the second portion.

Still other embodiments provide for a method comprising obtaining user context information associated with a user, wherein the user context information comprises a first portion and a second portion different from the first portion; and disambiguating between a first concept in a knowledge representation (KR) associated with a first meaning of the first portion and a second concept in the KR associated with a second meaning of the first portion, wherein the disambiguating is performed at least in part by using at least one processor, a measure of dominance of the first concept, and a measure of semantic coherence between the first concept and a third concept associated with a meaning of the second portion.

Still other embodiments provide for a system comprising at least one processor configured to perform: obtaining user context information associated with a user, wherein the user context information comprises a first portion and a second portion different from the first portion; and disambiguating between a first concept in a knowledge representation (KR)

associated with a first meaning of the first portion and a second concept in the KR associated with a second meaning of the first portion, wherein the disambiguating is performed at least in part by using a measure of dominance of the first concept and a measure of semantic coherence between the first concept and a third concept associated with a meaning of the second portion.

Still other embodiments provide for at least one non-transitory computer-readable storage medium storing processor executable instructions that, when executed by at least one processor, cause the at least one processor to perform a method comprising: obtaining user context information associated with a user, wherein the user context information comprises a first portion and a second portion different from the first portion; and disambiguating between a first concept in a knowledge representation (KR) associated with a first meaning of the first portion and a second concept in the KR associated with a second meaning of the first portion, wherein the disambiguating is performed at least in part by using a measure of dominance of the first concept and a measure of semantic coherence between the first concept and a third concept associated with a meaning of the second portion.

Some embodiments provide for a method comprising identifying, based on a graph of a knowledge representation (KR), a first semantic context of a first concept in the KR; identifying, based on the graph of the KR, a second semantic context of a second concept in the KR; and calculating, by using at least one processor, a measure of semantic coherence between the first concept and the second concept based at least in part on an amount of overlap between the first semantic context and the second semantic context.

Other embodiments provide for a system comprising at least one processor configured to perform identifying, based on a graph of a knowledge representation (KR), a first semantic context of a first concept in the KR; identifying, based on the graph of the KR, a second semantic context of a second concept in the KR; and calculating a measure of semantic coherence between the first concept and the second concept based at least in part on an amount of overlap between the first semantic context and the second semantic context.

Still other embodiments provide for at least one non-transitory computer-readable storage medium storing processor executable instructions that, when executed by at least one processor, cause the at least one processor to perform a method comprising: identifying, based on a graph of a knowledge representation (KR), a first semantic context of a first concept in the KR; identifying, based on the graph of the KR, a second semantic context of a second concept in the KR; and calculating a measure of semantic coherence between the first concept and the second concept based at least in part on an amount of overlap between the first semantic context and the second semantic context.

BRIEF DESCRIPTION OF DRAWINGS

The accompanying drawings are not intended to be drawn to scale. Like elements are identified by the same or like reference designations when practical. For purposes of clarity, not every component may be labeled in every drawing. In the drawings:

FIG. 9 is a table of scores computed for the concepts in the context intersection graph shown in FIG. 8 during iterations of a scoring algorithm described herein and in accordance with some embodiments.

DETAILED DESCRIPTION

I. Knowledge Representations

Figure 1:
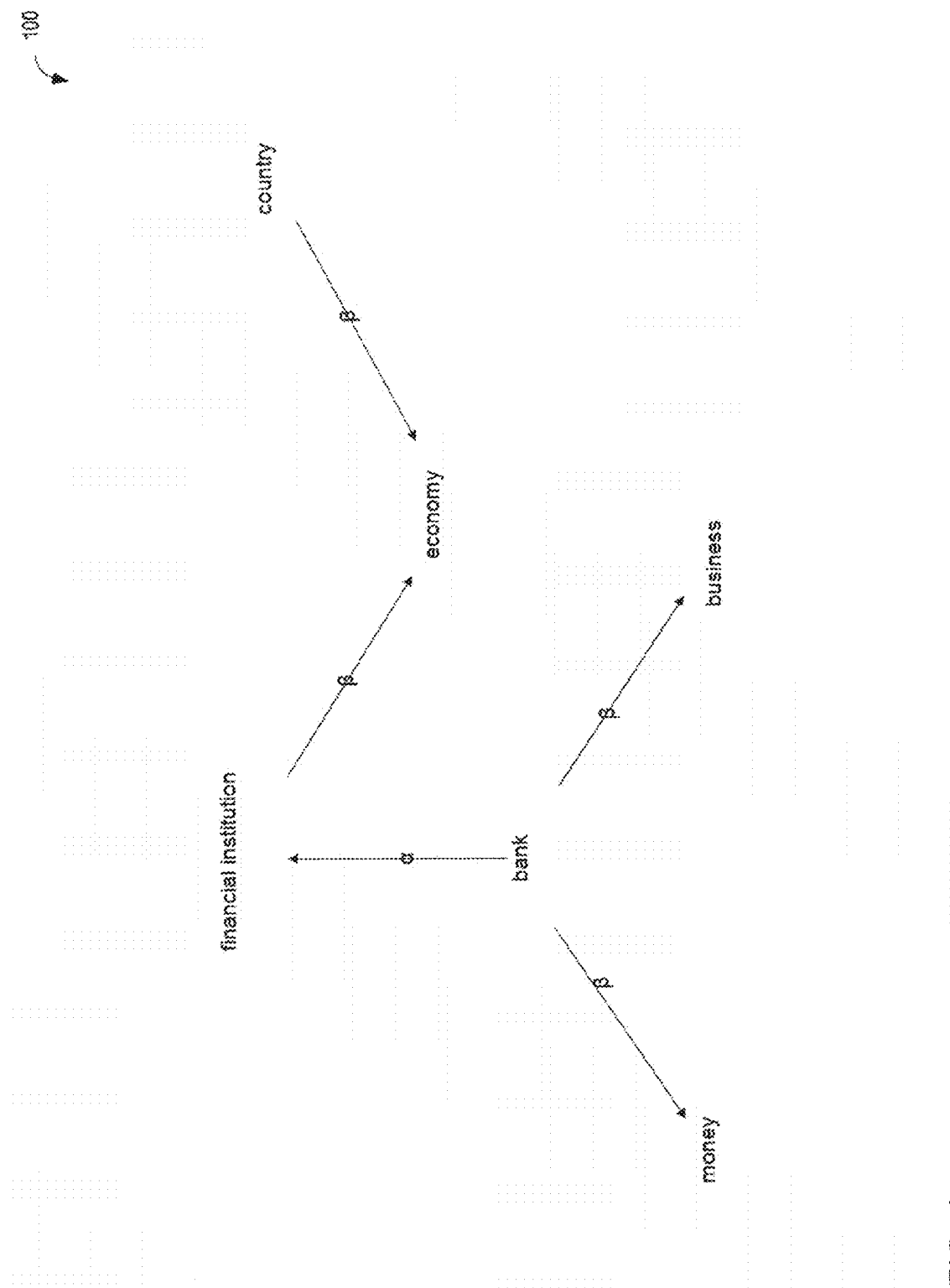
FIG. 1 illustrates a knowledge representation, in accordance with some embodiments.

Broadly, knowledge representation is the activity of making abstract knowledge explicit, as concrete data structures, to support machine-based storage, management (e.g., information location and extraction), and reasoning systems. Conventional methods and systems exist for utilizing knowledge representations (KRs) constructed in accordance with various types of knowledge representation models, including structured controlled vocabularies such as taxonomies, thesauri and faceted classifications; formal specifications such as semantic networks and ontologies; and unstructured forms such as documents based in natural language.

A taxonomy is a KR structure that organizes categories into a hierarchical tree and associates categories with relevant objects such as physical items, documents or other digital content. Categories or concepts in taxonomies are typically organized in terms of inheritance relationships, also known as supertype-subtype relationships, generalization specialization relationships, or parent-child relationships. In such relationships, the child category or concept has the same properties, behaviors, and constraints as its parent plus one or more additional properties, behaviors or constraints. For example, the statement of knowledge, "a dog is a mammal," can be encoded in a taxonomy by concepts/categories labeled "mammal" and "dog" linked by a parent-child hierarchical relationship. Such a representation encodes the knowledge that a dog (child concept) is a type of mammal (parent concept), but not every mammal is necessarily a dog.

A thesaurus is a KR representing terms such as search keys used for information retrieval, often encoded as single-word noun concepts. Links between terms/concepts in thesauri are typically divided into the following three types of relationships: hierarchical relationships, equivalency relationships and associative relationships. Hierarchical relationships are used to link terms that are narrower and broader in scope than each other, similar to the relationships between concepts in a taxonomy. To continue the previous example, "dog" and "mammal" are terms linked by a hierarchical relationship. Equivalency relationships link terms that can be substituted for each other as search terms, such as synonyms or near-synonyms. For example, the terms "dog" and "canine" could be linked through an equivalency relationship in some contexts. Associative relationships link related terms whose relationship is neither hierarchical nor equivalent. For example, a user searching for the term "dog" may also want to see items returned from a search for "breeder", and an associative relationship could be encoded in the thesaurus data structure for that pair of terms.

Faceted classification is based on the principle that information has a multi-dimensional quality, and can be classified in many different ways. Subjects of an informational domain are subdivided into facets (or more simply, categories) to represent this dimensionality. The attributes of the domain are related in facet hierarchies. The objects within the domain are then described and classified based on these attributes. For example, a collection of clothing being offered for sale in a physical or web-based clothing store could be classified using a color facet, a material facet, a style facet, etc., with each facet having a number of hierarchical attributes representing different types of colors, materials, styles, etc. Faceted classification is often used in faceted search systems, for example to allow a user to search the collection of clothing by any desired ordering of facets, such as by color-then-style, by style-then-color, by material-then-color-then-style, or by any other desired prioritization of facets. Such faceted classification contrasts with classification through a taxonomy, in which the hierarchy of categories is fixed.

A semantic network is a KR that represents various types of semantic relationships between concepts using a network structure (or a data structure that encodes or instantiates a network structure). A semantic network is typically represented as a directed or undirected graph consisting of vertices representing concepts, and edges representing semantic relationships linking pairs of concepts. One example of a semantic network is WordNet, a lexical database of the English language. Another example of a semantic network is shown in FIG. 1, which shows semantic network 100 represented as a graph comprising six nodes corresponding to the concepts "bank," "financial institution," "money," "economy," "country," and "business." Semantic network 100 illustrates two types of semantic relationships linking pairs of concepts: an α (alpha) relationship and a β (beta) relationship. An α relationship, represented by a directed edge from a node representing concept A to a node representing concept B, indicates "concept A is a type of concept B." For example, as shown in FIG. 1, the α relationship represented by a directed edge from the node representing the concept "bank" to the node representing concept "financial institution" indicates that a bank is a type of financial institution. A β relationship, represented by a directed edge from a node representing concept A to a node representing concept B indicates that "concept A is defined by concept B." For example, as shown in FIG. 1, the β relationship represented by a directed edge from the node representing the concept "economy" to the node representing the concept "country" indicates that the concept of an economy is defined by a country (i.e., the country whose economy may be at issue).

References to a semantic network or other KRs as being represented by a graph should be understood as indicating that a semantic network or other KR may be encoded into a data structure in a computer-readable memory or file or similar organization, wherein the structure of the data storage or the tagging of data therein serves to identify for each datum its significance to other data—e.g., whether it is intended as the value of a node or an end point of an edge or the weighting of an edge, etc.

An ontology is a KR structure encoding concepts and relationships between those concepts that are restricted to a particular domain of the real or virtual world that it is used to model. The concepts included in an ontology typically represent the particular meanings of terms as they apply to the domain being modeled or classified, and the included concept relationships typically represent the ways in which those concepts are related within the domain. For example, concepts corresponding to the word "card" could have different meanings in an ontology about the domain of poker and an ontology about the domain of computer hardware.

In general, all of the above-discussed types of KRs, as well as other conventional examples, are tools for modeling human knowledge in terms of abstract concepts and the relationships between those concepts, and for making that knowledge accessible to machines such as computers for performing various knowledge-requiring tasks. As such, human users and software developers conventionally construct KR data structures using their human knowledge, and manually encode the completed KR data structures into machine-readable form as data structures to be stored in machine memory and accessed by various machine-executed functions.

Each concept in a knowledge representation may be associated with a label representing the name of the concept. For example, a knowledge representation may comprise concepts having the labels "Apple," "Fruit," and "Computer." A knowledge representation may comprise multiple different concepts having the same label, but each of these concepts may be associated with a different meaning of that label. For example, a knowledge representation may have two concepts each of which has the label "Apple," but the first concept may be associated with "Apple" the fruit and the second concept may be associated with "Apple" the computer company.

Concepts in a knowledge representation having the same label may be distinguished from one another based on the relationships these concepts have with other concepts in the knowledge representation. Concepts having the same label may have different relationships with other concepts in the knowledge representation and, because each of these concepts may have a relationship with a different set of concepts, concepts having the same label may be associated with different meanings. For example, a first concept having the label "Apple" may have a relationship with the concept having the label "Fruit," while another concept having the label "Apple" may have a relationship with the concept having the label "Computer." Accordingly, the first concept having the label "Apple" may be associated with the meaning of apple as in a fruit, whereas the second concept having the label "Apple" may be associated with the meaning of apple as in the name of a computer company.

In embodiments where the knowledge representation is a semantic network, the semantic network may comprise a first node representing the first concept having the label "Apple" and a second node (different from the first node) representing the second concept having the label "Apple." The semantic network may also comprise an edge from the first node to a node in the semantic network representing the concept "Fruit," and an edge from the second node to a node in the semantic network representing a concept having the label "Computer." In addition to having different relationships with other concepts in the knowledge representation, concepts having the same label may be differentiated based on auxiliary information such as different identifiers.

Additional examples of knowledge representations, examples of techniques for constructing knowledge representations, and other aspects of knowledge representations are further described in U.S. patent application Ser. No. 13/165,423, filed, and entitled "Systems and Methods for Analyzing and Synthesizing Complex Knowledge Representations," which is hereby incorporated by reference in its entirety.

II. Discussion of Some Embodiments

Some embodiments described below provide techniques for identifying one or multiple concepts in a knowledge representation associated with the meaning of information provided by a user (e.g., a user-specified search query). The techniques may be applied to identifying concepts in any suitable type of knowledge representation including, but not limited to, any of the above-described examples of knowledge representations. In turn, the identified concept(s) may be used to select digital content from a large set of digital content so that the selected content may be provided to the user. In this way, the user may be provided with information the user is seeking.

It should be appreciated that the various aspects of the present disclosure described herein may be implemented in any of numerous ways, and are not limited to any particular implementation technique. Examples of specific implementations are described below for illustrative purposes only, but aspects of the invention described herein are not limited to these illustrative implementations. Additionally, unless it clearly appears otherwise from the particular context, it is intended that the various features and steps described herein may be combined in ways other than the specific example embodiments depicted and that such other combinations are within the scope of the disclosure and are contemplated as inventive.

Figure 2:
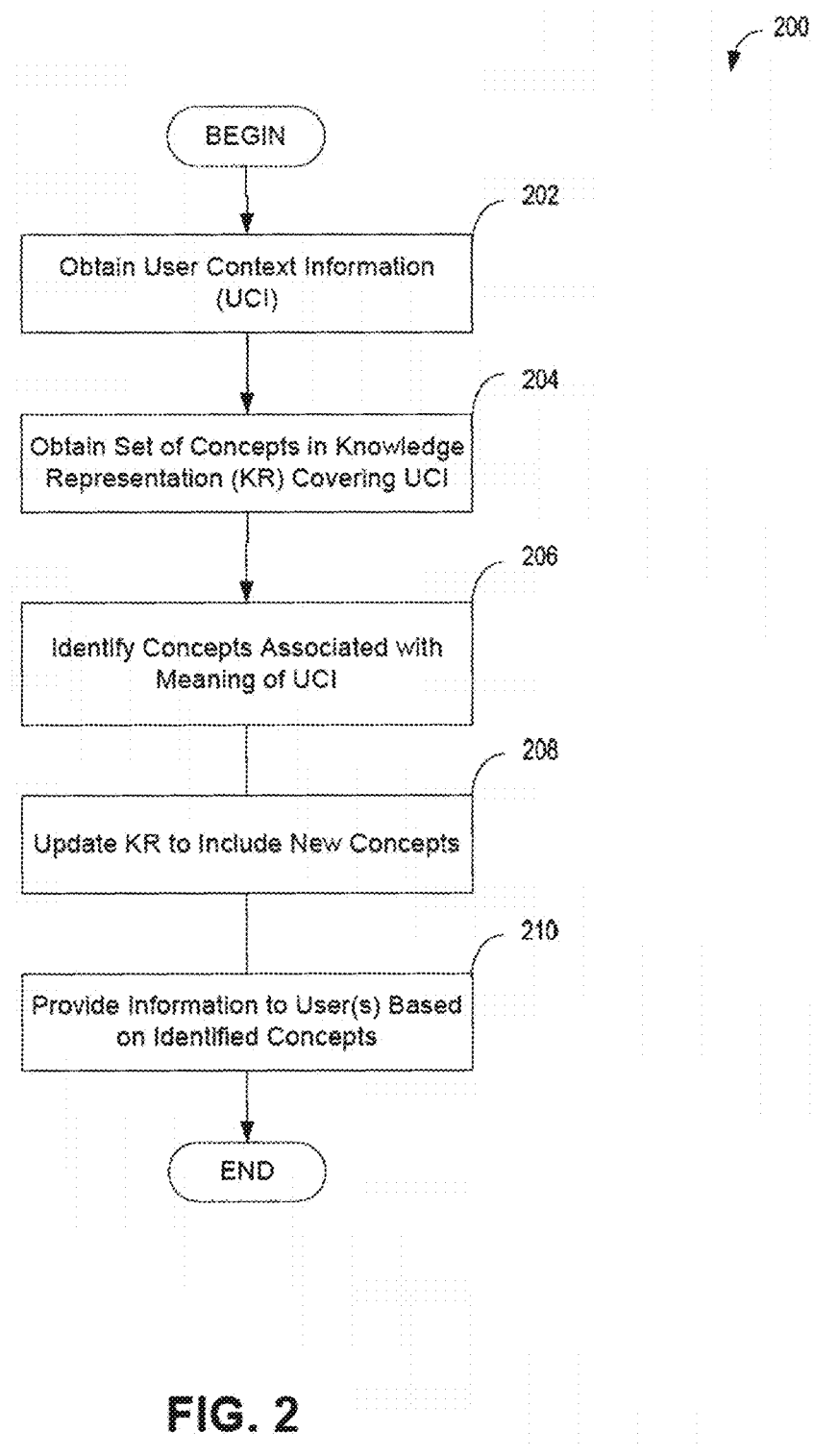
FIG. 2 is a flowchart of an illustrative process for providing a user with digital content selected from a large set of digital content based on a knowledge representation, in accordance with some embodiments.

FIG. 2 is a flow chart of an illustrative process 200 for providing a user with digital content selected from a large set of digital content based on a knowledge representation that may be used in some embodiments. As described above, the knowledge representation may be of any suitable type, examples of which have been provided above and can be found in U.S. patent application Ser. No. 13/165,423, titled "Systems and Methods for Analyzing and Synthesizing Complex Knowledge Representations," filed Jun. 21, 2011, which is hereby incorporated by reference in its entirety.

Process 200 begins at act 202, where user context information (UCI) associated with one or more users may be obtained. As described in greater detail below, user context information may comprise any suitable information associated with the user(s) and/or provided by the user(s).

Process 200 then continues to act 204, where one or more independent concepts covering the user context information are identified in the knowledge representation. A set of one or more concepts is said to cover the user context information when the UCI may be formed as a combination of one or more labels of concepts in the set of concepts. As an illustrative example, if the UCI is a string "Apple Desktop Computer," a concept having the label "Apple" does not alone cover the UCI because "Apple Desktop Computer" cannot be formed by using only the label "Apple." On the other hand, the combination of concepts "Apple" and "Desktop Computer" covers the UCI because the string "Apple Desktop Computer" may be formed as a combination of labels "Apple" and "Desktop Computer." As another example, the set of three concepts having respective labels of "Apple," "Desktop," and "Computer" also covers the UCI. As yet another example, the concept having the label "Apple Desktop Computer" covers the user context information alone. Similarly, a set of one or more concepts is said to cover a portion of the user context information when that portion of the UCI may be formed as a combination of one or more labels of concepts in the set of concepts. For example, a concept having the label "Desktop Computer" covers the UCI portion "Desktop Computer," but does not cover either the UCI portion "Apple" or the entire UCI "Apple Desktop Computer."

Figure 4:
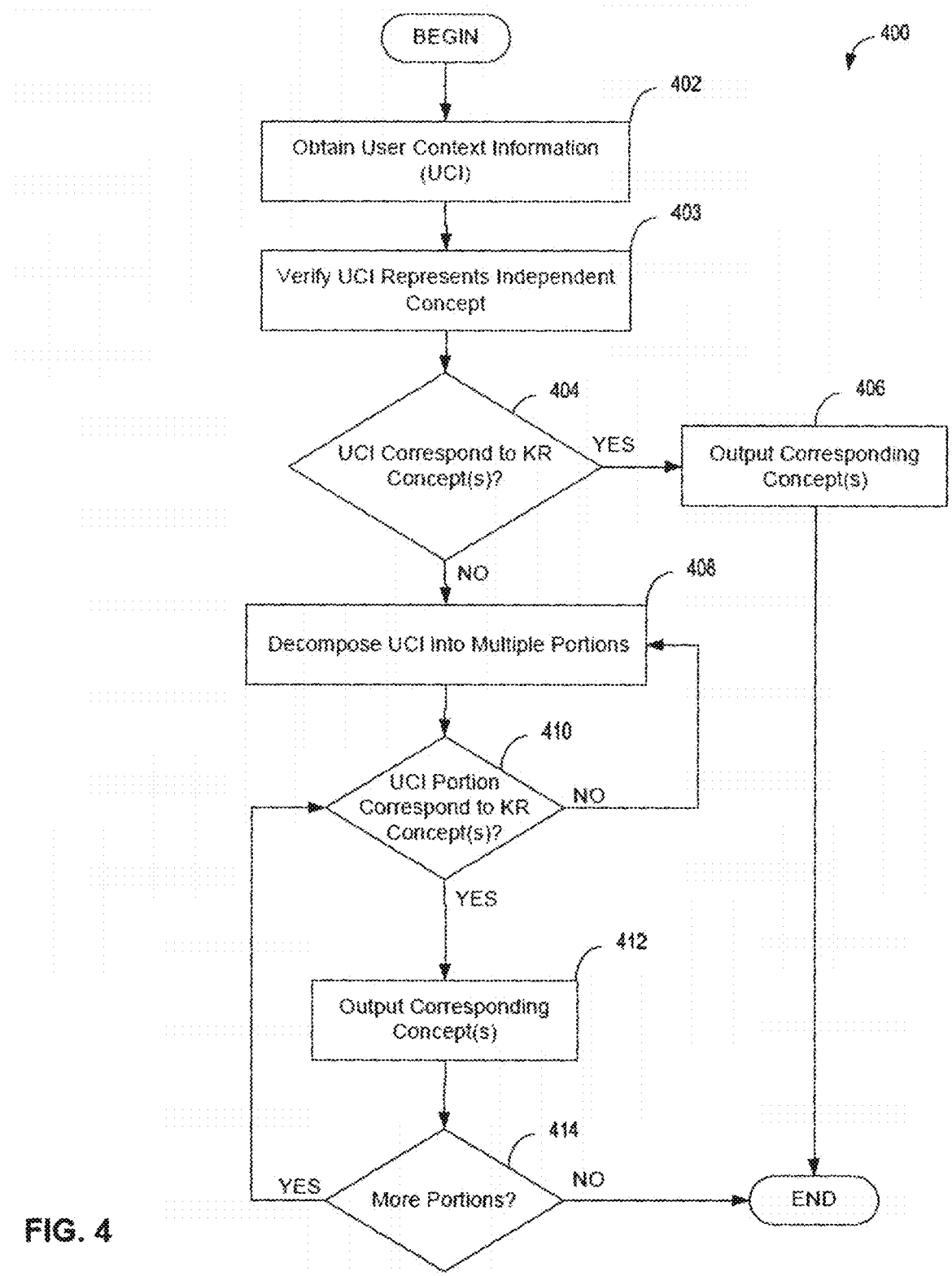
FIG. 4 is a flowchart of an illustrative process for identifying multiple concepts in a knowledge representation corresponding to user context information, in accordance with some embodiments.

At act 204, one or more independent concepts covering the user context information may be identified either by identifying one or more independent concepts in the knowledge representation each of which alone covers the UCI in its entirety or by partitioning or decomposing the UCI into multiple disjoint portions and, for each such portion, identifying one or more independent concepts in the KR covering that portion. For example, if the user context information is the string "Apple Desktop Computer" and the knowledge representation includes a concept having the label "Apple Desktop Computer," this concept may be identified as covering the UCI on its own. However, if the knowledge representation does not contain any concepts having the label "Apple Desktop Computer," the string "Apple Desktop Computer" may be decomposed into two disjoint portions: "Apple" and "Desktop Computer" and, act 204 may comprise identifying one or multiple concepts in the knowledge representation having the label "Apple" (e.g., a concept representing "Apple" the fruit, a concept representing "Apple" the computer company, a concept representing "Apple" the name of Gwyneth Paltrow's daughter, etc.) and may comprise identifying one or multiple concepts in the knowledge representation having the label "Desktop Computer." If the knowledge representation does not contain any concept representing a portion of the UCI, that portion may be further decomposed into smaller portions to identify whether any of those smaller portions is represented by one or more concepts in the knowledge representation. For example, if the knowledge representation does not have any concept with a label "Desktop Computer," the string "Desktop Computer" may be further decomposed into "Desktop" and "Computer" and act 204 may comprise identifying one or more concepts in the knowledge representation having the label "Desktop" and one or more concepts in the knowledge representation having the label "Computer." The decomposition process may recursively decompose user context information to identify concepts covering one or portions of the user context information. Identifying concepts in a knowledge representation that cover the user context information is further described below with reference to FIG. 4.

Process 200 then continues to act 206, where for each portion of the UCI obtained at act 204, a single concept associated with a meaning of that portion is selected from the set of independent concepts that was identified at act 204 as covering the user context information. In particular, when multiple concepts associated with different meanings of a UCI portion have been identified at act 204, at act 206 one of these concepts is selected as the concept associated with the meaning of the UCI portion. For example, multiple concepts having the label "Apple" may be identified as part of the set of concepts covering the UCI "Apple Desktop Computer." Each of the identified concepts may be associated with a different meaning of "Apple" (e.g., fruit, computer company, given name, etc.). At act 206, a single concept may be selected from among these three concepts as the concept associated with the meaning of that portion of the user context information. The selected concept may be associated with the meaning that was intended by the user. This may be done in any suitable way and, in some embodiments, may be done based at least in part on one or more other portions in the user context information. For example, the concept "Apple" as in the computer company may be identified at act 206 based at least in part on the words "Desktop Computer," which are also part of the user context information.

The disambiguation process of selecting a concept associated with a meaning of a particular portion of the UCI may be implemented using any of numerous techniques. In some embodiments, this may be done by calculating a measure of coherence between the concepts associated with one or more different meanings of the particular UCI portion and one or more concepts associated with one or more different meanings of another UCI portion. In the above example, this may comprise calculating a measure of coherence for a concept associated with the meaning of the UCI portion "Apple" and a concept associated with the meaning of the UCI portion "Desktop Computer." The measure of the coherence between two concepts in a set of independent concepts covering may be calculated in any suitable way and, in some embodiments, may be calculated by using the graph of a knowledge representation as described in more detail below.

Additionally or alternatively, the disambiguation process of selecting a concept associated with a meaning of a particular portion of the UCI may be implemented based at least in part of a measure of dominance of a concept. Among a set of concepts having the same label, the dominant concept is the concept associated with the more dominant or typical meaning of the label, when taken out of context. For example, the most dominant meaning of the term "bank" may be a "financial institution," rather than bank of a river, or bank the word game. The measure of dominance of a concept may be calculated in any suitable way and, in some embodiments, may be calculated at least in part by using the graph of a knowledge representation as described in more detail below.

Figure 5:
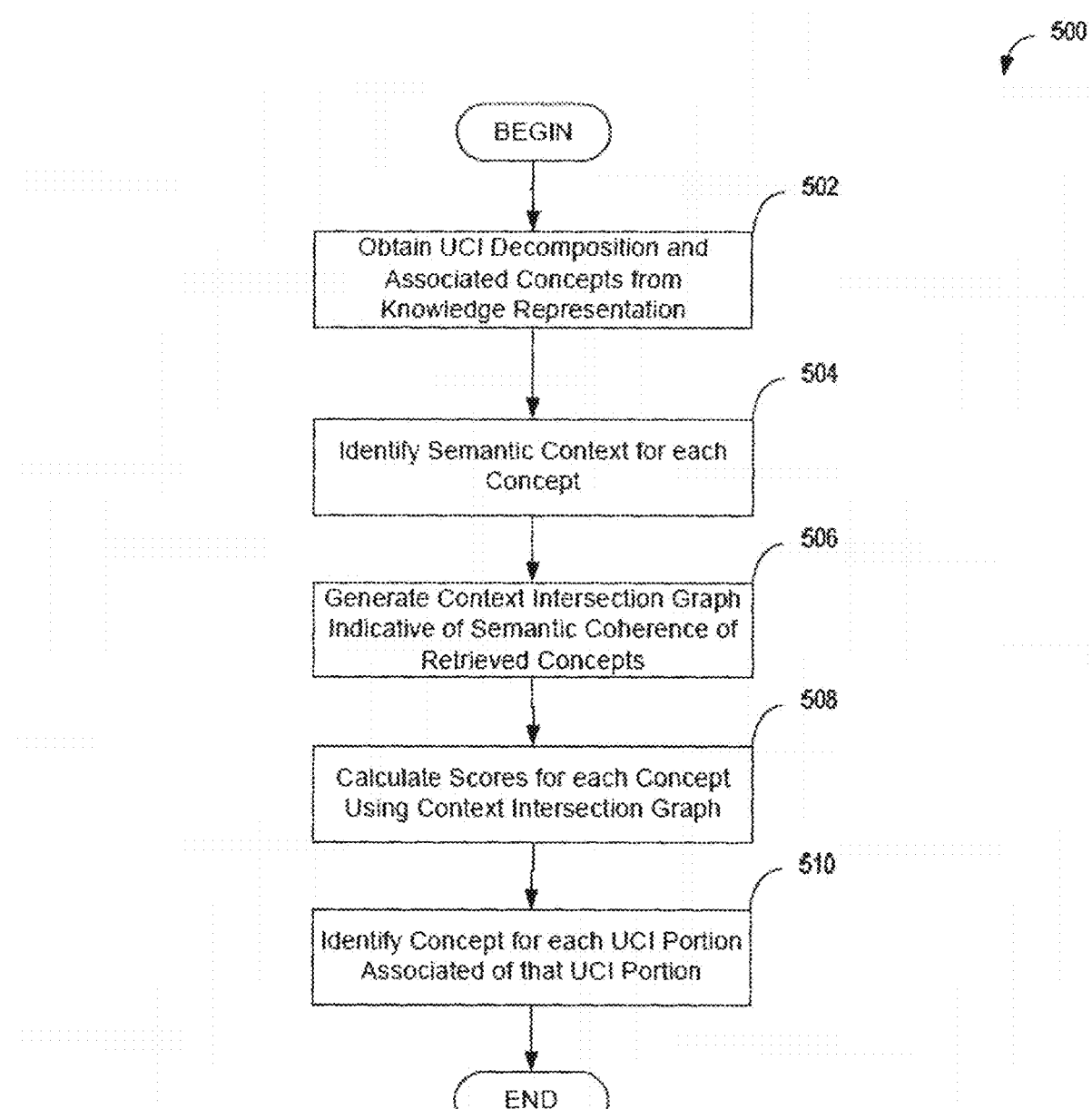
FIG. 5 is a flowchart of an illustrative process, for identifying a concept associated with a meaning of one or more portions of the user context information, in accordance with some embodiments.

Accordingly, it should be appreciated that in some embodiments above-described disambiguation process may be performed by using a measure of dominance of one or more concepts, a measure of semantic coherence among one or more concepts, or any suitable combination of using a measure of coherence and a measure of dominance. One illustrative example of the disambiguation process of selecting a concept associated with a meaning of a portion of the UCI is described in more detail below with reference to FIG. 5.

Process 200 then continues to act 208, where if the knowledge representation does not contain at least one concept that, on its own, covers the user context information received at act 202, the knowledge representation is updated to include a new concept covering the UCI on its own. In this way, the knowledge representation will be updated, at act 208, to contain a concept having the UCI obtained at act 202 as its label. For example, if the knowledge representation did not have a concept having the label "Apple Desktop Computer," a concept having this label may be added at act 208.

After the new concept having the UCI obtained at act 202 is added to the KR, the knowledge representation may be further updated to represent relationships between the new concept and one or more other concepts already in the knowledge representation. The knowledge representation may be updated to represent relationships between the new concept having the UCI as its label and the concepts identified at act 206 as associated with a meaning of each portion of the UCI. In the above example, the KR may be updated to represent a relationship between the new concept having the label "Apple Desktop Computer" and the concept "Apple" representing the computer company identified at act 206.

Process 200 then proceeds to act 210, where content may be provided to the one or more users. Such content may be selected from a large set of content by using the concept(s) identified at act 206, any concepts added to the knowledge representation at act 208, and/or any concepts in the knowledge representation related to the identified concept(s).

Each of the acts of the process of FIG. 2 may be performed in any of a variety of ways, and some examples of the ways in which these acts may be performed in various embodiments are described in greater detail below.

Process 200 and any of its variants may be implemented using hardware, software or any suitable combination thereof. When implemented in software, the software may execute on any suitable processor or collection of processors, whether stand-alone or networked. The software may be stored as processor-executable instructions and configuration parameters; such software may be stored on one or more non-transitory, tangible computer-readable storage media.

Software implementing process 200 may be organized in any suitable manner. For example, it may be organized as a software system comprising one or more software modules such that each software module may perform at least a part of one or more acts of process 200. Though, in some embodiments, one or more software modules of such a software system may perform functions not related to acts of process 200, as aspects of the present invention are not limited in this respect.

III. Obtaining User Context Information

As discussed above, user context information associated with one or more users may be obtained at act 202 of process 200. User context information may comprise any information that may be used to identify what information the user(s) may be seeking. User context information may include any suitable information related to the user(s) that may be collected from any available sources and/or any suitable information directly provided by the user(s).

One illustrative example of information related to a user is demographic information (e.g., gender, age group, education level, etc.) associated with the user. Another example of information related to a user is the user's Internet browsing history. A user's browsing history may comprise a list of one or more websites that the user has viewed. The user's browsing history may further include information the user had searched for and the search results the user obtained in response to any such searches. Yet another example of information related to a user is any information associated with the user on one or more websites such as social networking websites, job posting websites, blogs, discussion threads, personal websites, etc. Such information may include information in the user's profile on the website, any information associated with multimedia (e.g., images, videos, etc.) corresponding to the user's profile, and/or any other information entered by the user on the website. Yet another example of information related to a user is geo-spatial information. Geo-spatial information may comprise the current location of the user and/or a computing device of the user (e.g., user's home, library in user's hometown, user's work place, a place to which the user has traveled, and/or the geographical location of the user's device as determined by the user's Internet IP address, etc.). Geospatial information may include an association between information about the location of the user's computing device and any content that the user was searching or viewing when the user's computing device was at or near that location. Yet another example of information related to a user is temporal information. Temporal information may comprise the time during which a user was querying or viewing specific content on a computing device. The time may be specified at any suitable scale such as on the scale of years, seasons, months, weeks, days, hours, minutes, seconds, etc.

Additionally or alternatively, user context information associated with one or more users may comprise information provided by the user(s). Such information may be any suitable information indicative of what information the user(s) may be seeking. For example, user context information may comprise one or more user search queries input by a user into a search engine (e.g., an Internet search engine, a search engine adapted for searching a particular domain such as a corporate intranet, etc.). As another example, user context information may comprise one or more user-specified indicators of the type of information the user may be interested in. A user may provide the indicator(s) in any of numerous ways. The user may type in or speak an indication of his preferences, select one or more options provided by a website or an application (e.g., select an item from a dropdown menu, check a box, etc.), highlight or otherwise select a portion of the content of interest to the user on a website or in an application, and/or in any other suitable manner. For example, the user may select one or more options on a website to indicate that he wishes to receive news updates related to a certain topic or topics, advertisements relating to one or more types of product(s), information about updates on any of numerous types of websites, newsletters, e-mail digests, etc.

Figure 3:
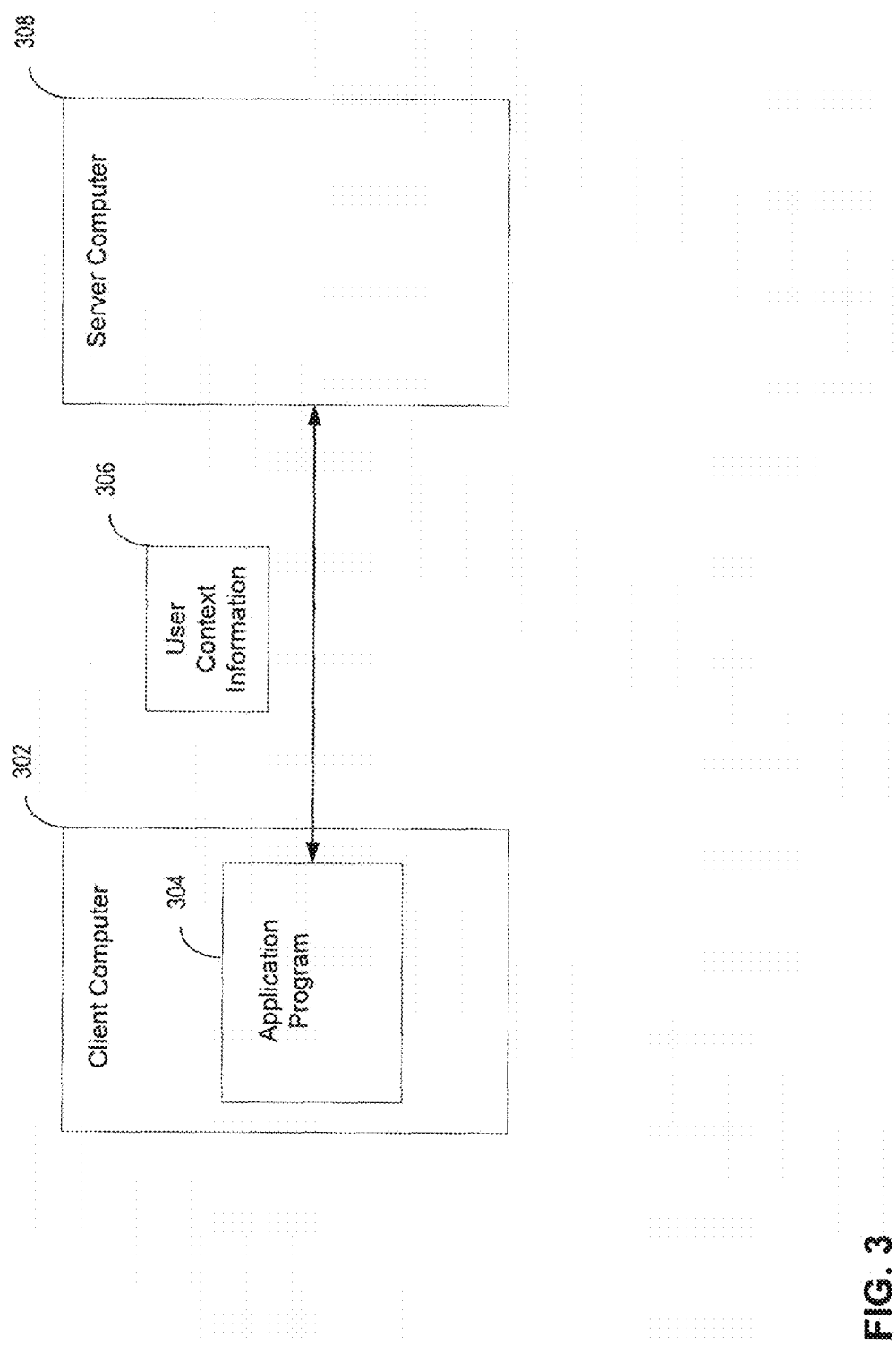
FIG. 3 is a block diagram of an illustrative client-server architecture that may be used to implement some embodiments.

The user context information may be obtained, in act 202, in any of a variety of possible ways. For example, in some embodiments, the user context information may be provided from a user's client computer to one or more server computers that execute software code that performs process 100. That is, for example, as shown in FIG. 3, a user may operate a client computer 302 that executes an application program 304. Application program 304 may send user context information 306 (e.g., a search query entered by the user into application program 304) to server computer 308, which may be a computer that performs process 200. Thus, server 308 may receive user context information 306 from application program 304 executing on client 302.

Application program 304 may be any of a variety of types of application programs that are capable of, directly or indirectly, sending information to and receiving information from server 308. For example, in some embodiments, application program 304 may be an Internet or WWW browser, an instant messaging client, or any other suitable application.

In the example of FIG. 3, application program 304 is shown as sending the user context information directly to server 308. It should be recognized that this is a simplified representation of how the user context information may be sent from client 302 to server 308, and that the user context information need not be sent directly from client 302 to server 308. For example, in some embodiments, the user's search query may be sent to server 308 via a network. The network may be any suitable type of network such as a LAN, WAN, the Internet, or a combination of networks.

It should also be recognized that aspects of the disclosure provided herein are not limited to receiving user context information from a user's client computer, as user context information may be obtained in any other suitable way. For example, user context information may be obtained, actively by requesting and/or passively by receiving, from any source(s) having access to, user context information associated with one or more users.

IV. Obtain Set of Concepts in Knowledge Representation Covering User Context Information As discussed above, at act 204 of process 200, one or more independent concepts covering the user context information may be identified. Any of a variety of possible techniques may be used to identify concept(s) covering the user context information. An example of one such technique that may be used in some embodiments is illustrated in process 400 of FIG. 4.

Process 400 may be used to identify one or more independent concepts covering the user context information. An independent concept may be a concept that shares a label with at least one concept in a knowledge representation. An independent concept may be a concept that occurs in an external corpus or external corpora at a frequency above a threshold frequency.

Process 400 begins at act 402, where user context information may be obtained. As previously discussed, user context information may comprise any of numerous types of information including, but not limited to, information about a user (e.g., profile of the user on a website, the user's browsing history, etc.) and/or information provided by the user (e.g., a search query). User context information may be represented via one or more alphanumeric strings. An alphanumeric string may comprise any suitable number of characters (including spaces), words, numbers, and/or any other types of symbols. An alphanumeric string may represent a user search query and/or any other suitable information indicative of what information the user may be interested in. Though, it should be recognized that any of numerous other data structures may be used to represent user context information and/or any portion thereof.

Next, process 400 proceeds to decision block 403, where it is verified that the user context information in its entirety represents an independent concept. This determination may be made in any suitable way. For example, it may be determined that the user context information in its entirety represents an independent concept if the user context information matches the label of at least one concept in a knowledge representation. Additionally or alternatively, it may be determined that the user context information represents an independent concept at least in part by analyzing an external corpus or external corpora. For example, it may be determined that the UCI represents an independent concept when the user context information is found to be a coherent concept based on its occurrences in one or more external corpora at a frequency above a threshold frequency. For instance, some input provided by a user (e.g., an entire paragraph) is unlikely to frequently occur in one or more external corpora and, as such, is unlikely to constitute a coherent concept. In contrast, portions of such input (e.g., a word or a phrase in the paragraph) may constitute a coherent concept. For example, the user context information "iTunes store for your Apple desktop computer to download music"

in its entirety is unlikely to match the label of a concept within a KR or occur at a sufficiently high frequency within a set of corpora. Accordingly, this user context information is not likely to represent an independent concept. Similarly, some components of this string, such as "iTunes store for your" would not likely to constitute a coherent concept. Other UCI portions, however, such as "iTunes store" and "Apple desktop computer" may be more likely to match the label of a concept within a KR or occur frequently in such corpora, which provides evidence that such components may as coherent, independent concepts.

In some embodiments, when it is determined that the UCI does not represent an independent concept, no concepts in the knowledge representation may be identified as covering the UCI and process 400 completes. When it is determined that the UCI does represent an independent concept, process 400 proceeds to act 404, where it is determined whether the UCI in its entirety corresponds to at least one concept in the knowledge representation. This may be done in any suitable way. For example, when the user context information is represented by an alphanumeric string, the string may be compared with the alphanumeric string representing the label of a concept to determine whether or not there is a match between them. For example, if the user context information is the string "Apple Desktop Computer," it may be determined, as part of decision block 404, whether there are one or more concepts in the knowledge representation whose labels match the string "Apple Desktop Computer."

In some embodiments, determining whether user context information matches a concept label may comprise determining whether the user context information matches a concept label exactly. In some embodiments, determining whether user context information matches a concept label may comprising determining whether the user context information substantially matches the label. In some embodiments, two strings substantially match one another if all words in the strings match exactly with the exception of a predetermined set of words (e.g., words such as "and," "the," "of," etc.). For example, the strings "The Apple Desktop" and "Apple Desktop" substantially match, but do not exactly match. In some embodiments, two strings may substantially match one another even if the order of the words in the strings is different. For instance, it may be determined that the string "The Apple Desktop" matches the string "Desktop Apple."

When it is determined at decision block 404 that the user context information corresponds to one or more concepts in the knowledge representation, process 400 proceeds to act 406, where the corresponding concept(s) are output. On the other hand, when it is determined that the user context information does not match any concept in the knowledge representation, process 400 proceeds to act 408, where the user context information is partitioned into multiple disjoint portions. For example, if it is determined that the knowledge representation does not contain any concepts having the label "Apple Desktop Computer," the string "Apple Desktop Computer" may be decomposed into two disjoint portions: "Apple" and "Desktop Computer," at act 408.

The decomposition may be performed in any suitable way. For example, in some embodiments, the decomposition may be performed so that one or more of the UCI portions obtained as a result of the decomposition matches a concept in the knowledge representation. To this end, in some embodiments, potential decompositions may be evaluated by using the knowledge representation and/or one or more external corpora to determine which of the potential decompositions of the user context information into multiple portions results in one or more portions that represent an independent concept.

In some embodiments, the decomposition of user context information may be performed so as to obtain the decomposition having the longest possible portion that matches a concept in the knowledge representation. Additionally or alternatively, the decomposition of user context information may be performed so as to obtain the decomposition having the portion that represents a least elemental and/or most complex concept in the knowledge representation.

After the user context information has been decomposed into multiple disjoint portions, at act 408, process 400 proceeds to decision block 410, where it is determined whether one of these portions (e.g., "Apple") corresponds to at least one concept in the knowledge representation. As described with reference to decision block 404, in some embodiments, this determination may be made by checking whether the portion matches at least one concept in the knowledge representation. A match between a UCI portion and one or more concepts in the knowledge representation may be determined in any of the ways described above with reference to decision block 404 and/or in any other suitable way.

When it is determined, at decision block 410, that the UCI portion matches at least one concept in the knowledge representation, process 400 proceeds to act 412, where the corresponding concept(s) are output together with the UCI portion.

After performing act 412, process 400 then proceeds to decision block 414, where it is determined whether there is at least one UCI portion for which a check as to whether that portion (e.g., "Desktop Computer") matches at least one concept in the knowledge representation has not been performed. When it is determined that a check has been performed for every UCI portion obtained at act 408 (e.g., such that the set of portions for which the check has been performed may be used to form the UCI in its entirety (for example, a check has been performed for both "Apple" and "Desktop Computer")), process 400 completes. When it is determined that there is at least one portion of the user context information that has not been checked for matching at least one concept in the knowledge representation, process 400 returns to decision block 410, where such a check is performed for the at least one portion.

On the other hand, when it is determined at decision block 414, that the UCI portion does not match at least one concept in the knowledge representation, process 400 branches to act 408, where the portion is further decomposed into a set of sub-portions. For example, if it is determined at decision block 410 that the user context information portion "Desktop Computer" does represent an independent concept that portion is further decomposed, for example, into the sub-portions "Desktop" and "Computer." Acts 410-414 are then repeated for each of these sub-portions.

In this way, unless the knowledge representation contains a concept whose label matches the entire user context information, process 400 may recursively decompose user context information into multiple portions until each of these portions is matched with one or more independent concepts already in the knowledge representation. The obtained portions and associated concepts are output at the completion of process 400.

V. Identify Knowledge Representation Concepts Associated with a Meaning of the User Context Information As discussed above, at act 206 of process 200, for each portion of the user context information obtained at act 204, a single concept associated with a meaning of that portion is selected from the set of concepts associated with different meanings of that portion. This may be done using any suitable disambiguation technique. An example of one such disambiguation technique that may be used in some embodiments is illustrated in process 500 of FIG. 5. Aspects of the technique described below are also discussed in the following pseudo-code terms and pseudo-code algorithms that provide illustrative but non-limiting examples.

Pseudo-Code Terminology

```
Input: List of labels to disambiguate L = {l_i | i = 1..N} ,
Output: Set of concepts C = {c_i|i = 1..N}
N_□: number of labels
N_li: number of concepts within one label
Concepts_li : Set of all concepts within one label
Concept_li^t : Concept t for label li
Context_li^t : Context made for concept t for label li
G: Context intersection graph
prior_t : Prior probability value for node t
```

In the above pseudo-code terminology, the inputs provided to the disambiguation algorithm (described in more detail below) may comprise a list of labels that have been obtained from portions of a UCI and the output may comprise a concept or a set of concepts in the knowledge representation that possess that label and the most-suitable meaning as determined by the disambiguation technique. These techniques may entail, for a particular label li, identifying concepts having label li and associated contexts as further described below. Such contexts may then be assembled into context intersection graph G that are demonstrated in process 500 of FIG. 5 and illustrated by item 600 in FIG. 6.

Process 500 begins at act 502, where a decomposition of user context information comprising multiple portions of the user context information is obtained. For each UCI portion, one or multiple concepts in the knowledge representation covering that portion are also obtained at act 502. For example, a decomposition of the user context information "Apple Desktop Computer" into three portions "Apple," "Desktop," and "Computer" may be obtained, at act 502. In addition, one or multiple concepts may be obtained for each of these three UCI portions. For example, a set of three concepts having the label "Apple," a single concept having the label "Desktop," and a set of two concepts having the label "Computer" may be obtained at act 502. In some embodiments, the decomposition of user context information comprising multiple portions and one multiple concepts for each of the portions may be obtained by using techniques described with reference to FIG. 4 above or any other suitable techniques.

Process 500 next proceeds to act 504, where a semantic context in the knowledge representation is identified for each concept obtained at act 502. A semantic context of a particular concept in a knowledge representation includes at least one other concept in the knowledge representation related to the particular concept. In some embodiments, a semantic context of a concept may be identified based at least in part on the structure of the knowledge representation. For example, when concepts in a knowledge representation may be represented as nodes of a graph and each edge in the graph represents a relationship between two concepts (e.g., a semantic network), the graph may be used to identify the semantic context of a node.

In some embodiments, a semantic context of a particular concept in a knowledge representation, whose structure may be represented by a graph ("the KR graph"), may be identified as the set of concepts within a predetermined distance of the particular concept in the graph. (As previously described, a semantic network is an example of a knowledge representation whose structure may be represented by a graph.) The distance may be computed with respect to the graph structure such that the distance between any two nodes in the graph is the number of edges in a shortest path connecting the two nodes. For example, the semantic context of a particular concept may be identified as the set of concepts represented by nodes within a distance of 1 of the node (i.e., neighbors) representing the particular concept. As another example, the semantic context of a particular concept may be identified as the set of concepts represented by nodes within a distance k of the node representing the particular concept, where k may be any suitable positive integer greater than one (e.g., 2, 3, 4, 5, 6, etc.).

In some embodiments, the semantic context of a particular concept may be identified as comprising one or more concepts having a direct β relationship with the particular concept. Accordingly, a semantic context of concept A in the KR may include concept B, if the KR graph has a directed β edge from the node representing concept A to the node representing concept B. Such concepts may be referred to as "direct attributes" of the particular concept. For example, as shown in FIG. 1, the concepts "money" and "business" are direct attributes of the concept "bank."

In some embodiments, the semantic context of a particular concept may be identified as comprising one or more concepts having an α relationship with the particular concept. Accordingly, a semantic context of concept A in the KR may include concept B, if the KR graph has a single directed α edge, or a path of directed α edges (the path having any suitable length), from the node representing concept A to the node representing concept B. Such concepts may be referred to as "ancestors" of the particular concept. For example, as shown in FIG. 1, the concept "financial institution" is an ancestor of the concept "bank."

In some embodiments, the semantic context of a particular concept may be identified as comprising one or more concepts that are direct attributes of an ancestor of the particular concept. That is, the semantic context of a concept A may comprise concept C, if concept B is an ancestor of concept A (connected by a path of α edges, the path having any suitable length) and concept C is a direct attribute of concept B (connected by a β edge). Such concepts may be referred to as "inherited attributes" of the particular concept. For example, as shown in FIG. 1, the concept "economy" is an inherited attribute of an ancestor of the concept "bank."

In some embodiments, a semantic context of a particular concept may be identified by using any one, some, and/or all of the above-described rules or any other suitable rules. For example, in some embodiments, as illustrated by the pseudo-code below, a semantic context of a particular concept may be identified as having all direct attributes of the particular concept, all ancestors of the particular concept within a predetermined distance (e.g., 5, 10, 15, 20, 25, 30, etc.) of the particular concept, and all inherited attributes via such ancestors. For example, as shown, in FIG. 1, the semantic context of the concept "bank" may include the concepts "money," "business," "financial institution," and "economy."

Pseudo-code algorithms that may exemplify an approach for identifying concepts having a label corresponding to a particular portion of a UCI and then subsequently generating the semantic context around each of those concepts is set forth below:

Pseudo-Code for Obtaining Concepts

```
for i = 1 to N do
    Concepts_{li} = GetConcepts(l_i)
    if Concepts_{li} is empty
        Concepts_{li} = CreateResidualConcept(l_i)
    end if
end for
```

The pseudo-code immediately above may return a series of concepts that possess a label from the UCI, or alternatively may generate a single residual concept for a given label (where that label has been determined to be associated with an independent concept using the above-described techniques) if the knowledge representation does not possess any concepts for that label. Next, pseudo-code is provided for illustrating one approach for obtaining the semantic context for each of these concepts.

Pseudo-Code for Generating a Semantic Context

```
for i = 1 to N do
    for t = 1 to N_{li} do
        Context_{li}^t = GetContext(Concept_{li}^t)
    end for
end for
```

After a semantic context is identified for each concept obtained at act 502, process 500 proceeds to act 506, where a (semantic) context intersection graph is generated. The context intersection graph may be indicative of the presence of semantic coherence among the concepts obtained at act 502. In particular, the context intersection graph may comprise an edge between two nodes as an indication of the presence of semantic coherence between the concepts represented by the two nodes. The context intersection graph may be generated in any suitable way, examples of which are provided in the description and pseudo-code examples below.

In some embodiments, the context intersection graph comprises a node for each of the concepts obtained at act 502. The context intersection graph further comprises an edge between any two nodes that represent two concepts whose semantic contexts intersect. For example, the context intersection graph may comprise node A representing concept A and node B representing concept B. Then, the context intersection graph may comprise an edge from node A to node B, when the semantic context of concept A (identified at act 504 of process 500) intersects with the semantic context of concept B (identified at act 504 of process 500).

In some embodiments, a semantic context intersects with another semantic context if the semantic contexts share at least a predetermined number (e.g., at least one, at least two, at least five, at least ten, etc.) of concepts. In other embodiments, a semantic context intersects with another semantic context if the semantic contexts share at least a predetermined number of concepts having the same label. In such embodiments, two semantic contexts may have no concepts in common (e.g., no concepts having a label and meaning in common), but one semantic context may have a concept with the same label as another concept in the other semantic context. For example, one semantic context may have a concept with the label "Bark" (as in the bark of a dog) and another semantic context may have a concept also having the label "Bark" (as in the bark of a tree). These semantic contexts intersect because they each have a concept with the same label "Bark."

In some embodiments, each edge of a context intersection graph may be associated with a weight. The weight of an edge may be a value providing a measure of semantic coherence between the concepts represented by the nodes incident to the edge. The measure of semantic coherence may be computed in any suitable way. In some embodiments, the measure of semantic coherence between concept A and concept B may be computed based at least in part on a characteristic of the intersection between the semantic context of concept A and the semantic context of concept B. For example, the characteristic of the intersection may be a value indicating a number of concepts in the intersection of the two semantic contexts. As another example, the characteristic of the intersection may be a value indicating a number of concepts having the same label in the intersection of the two semantic contexts. As yet another example, the characteristic of the intersection may be computed using Dice's coefficient as described in the pseudo-code algorithms that follow.

Pseudo-Code for Intersection Calculation and Dice's Coefficient

```
for i = 1 to N do
    for j = i + 1 to N do
        for t = 1 to N_{li} do
            for q = 1 to N_{lj} do
                similarity_{tq} = SemanticIntersection(Context_{li}^t, Context_{lj}^q)
            end for
        end for
    end for
end for
Intersection Calculation (Dice's Coefficient)
SemanticIntersection(S1, S2) = $\frac{2*|S1 \cap S2|}{|S1| + |S2|}$
```

The foregoing pseudo-code illustrates how the semantic context of two concepts may be compared to one another. Each of the concepts in each of the contexts are cycled through and intersections may be identified and tallied. The higher the overlap proportion between contexts (or some function thereof, e.g., Dice's Coefficient), the greater the original concepts being compared may be deemed to be similar to one another.

Figure 6:
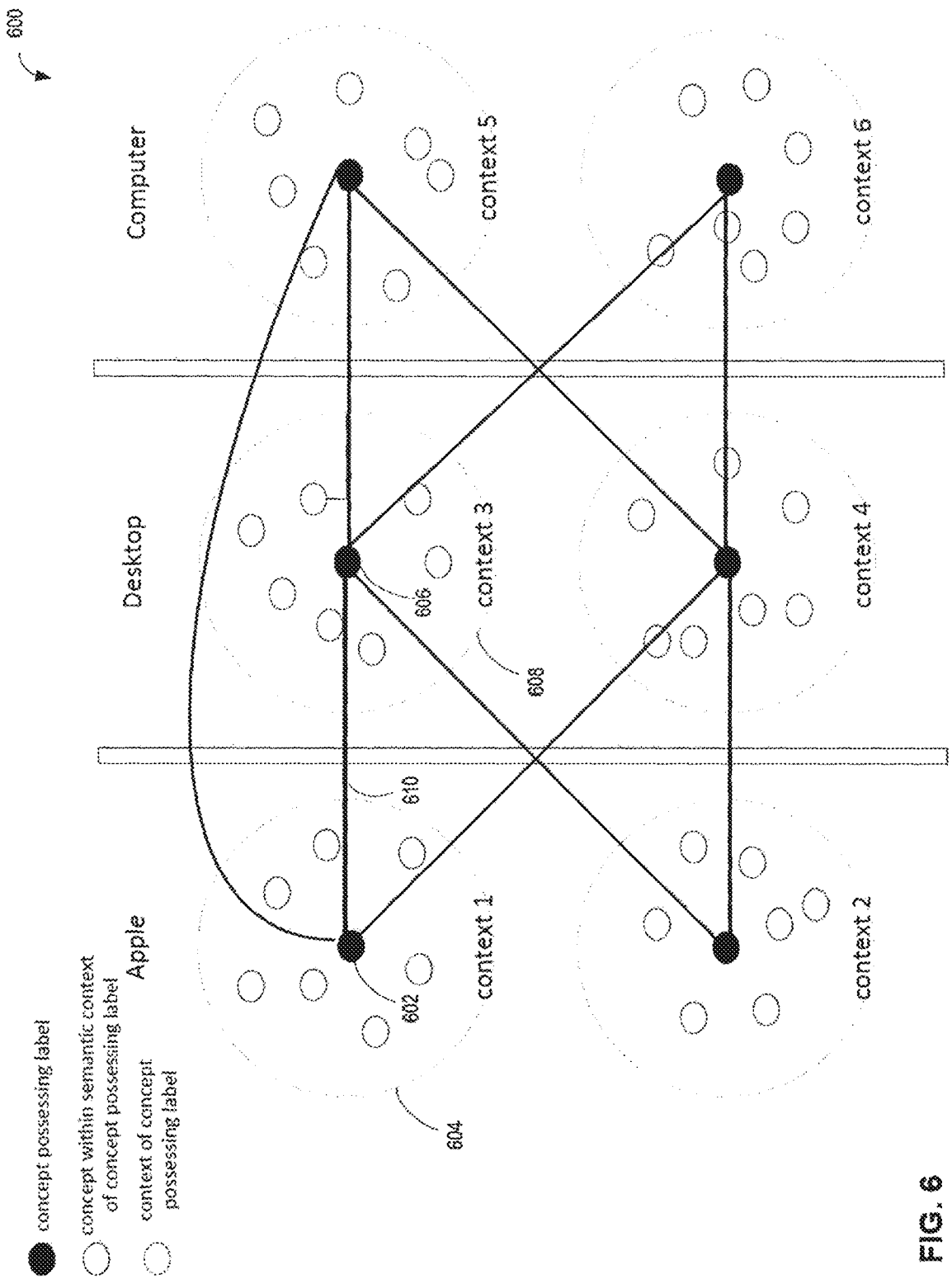
FIG. 6 illustrates a context intersection graph, in accordance with some embodiments.
Figure 8:
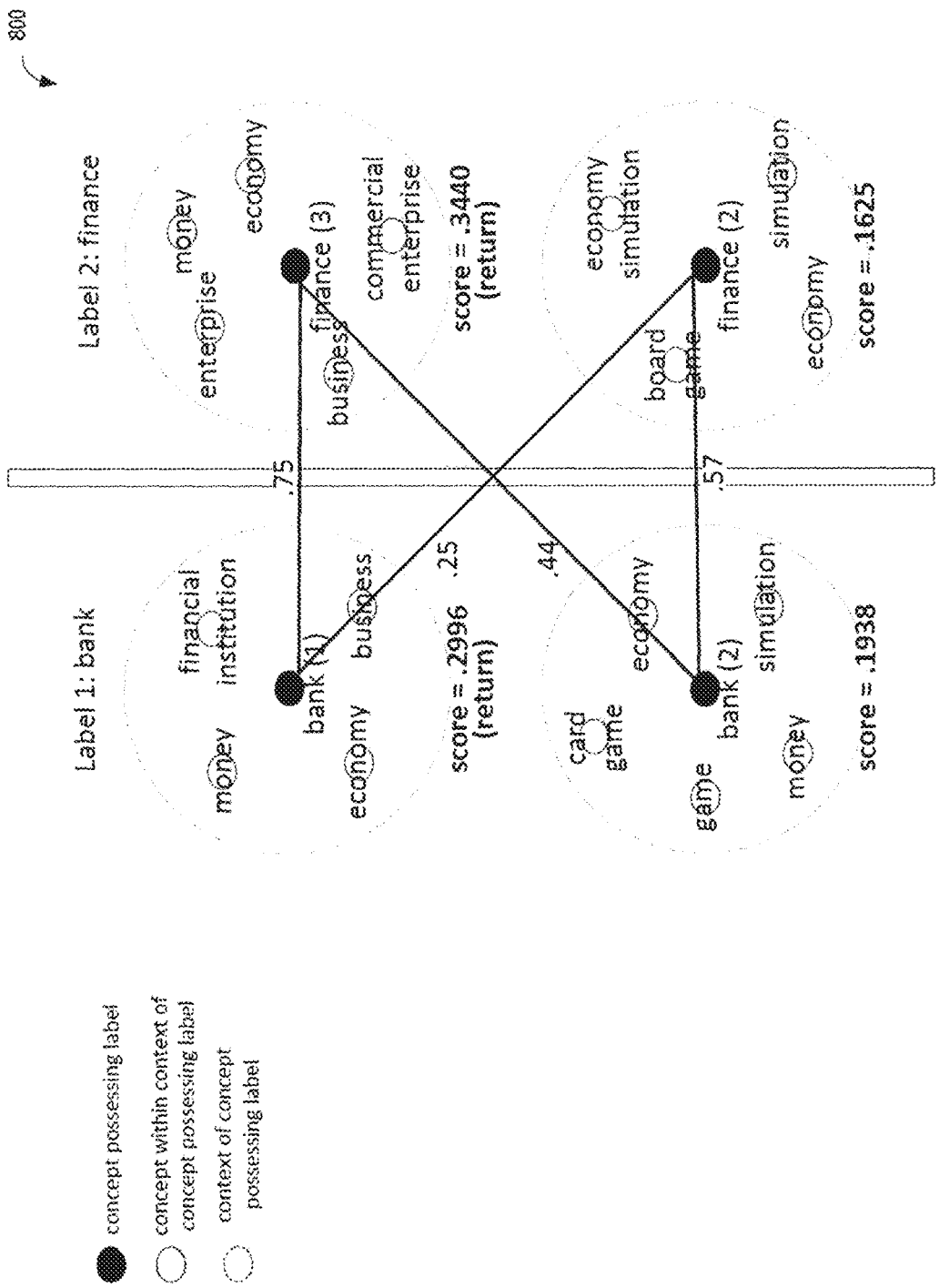
FIG. 8 illustrates another context intersection graph, in accordance with some embodiments.

An illustrative example of a context intersection graph 600 is shown in FIG. 6. The context intersection graph 600 comprises six nodes corresponding to concepts obtained from the set of concepts covering the user context information "Apple Desktop Computer." In the example, "Apple Desktop Computer" is decomposed into three portions "Apple," "Desktop" and "Computer," and two concepts in the KR were identified for each of these portions. A semantic context is identified for each of the six concepts and edges between the nodes representing the concepts are added to the context intersection graph when the respective semantic contexts intersect. For example, an edge 610 connects nodes 602 and 606 because context 604 and context 608 intersect. Another example of a context intersection graph 800 is shown in FIG. 8. The context intersection graph 800 comprises four nodes corresponding to concepts obtained from the set of concepts covering the user context information "Bank Finance." In the example, "Bank Finance" is decomposed into two portions "Bank" and "Finance," and two concepts in the KR were identified for each of these portions.

It should be appreciated that there may not be any edges between any two nodes, in a context intersection graph, representing concepts having the same label. In this way, the context intersection graph may be k-partite, where k represents the number of distinct portions of the user context information obtained as part of the decomposition process, such as for example the process, described with reference to FIG. 4.

It should be appreciated that a context intersection graph is not the same as the graph of the knowledge representation based on which the context intersection graph is constructed. The context intersection graph may be constructed based on concepts in the set of concepts identified as covering user context information (e.g., at act 204 of process 200) and the graph of the KR. As such, a different context intersection graph may be constructed for different instances of user context information based on the same underlying knowledge representation graph. For example, the user context information "Bank Finance" may lead to the construction of a context intersection graph different from the context intersection graph constructed for the user context information "Apple Desktop Computer," but both context intersection graphs may be constructed based on the topology (represented by a graph) of the same knowledge representation.

It should also be appreciated that a context intersection graph comprises a node for each concept in the set of concepts covering the user context information, whereas a graph of a knowledge representation comprises a node for each concept in the knowledge representation. A graph of a knowledge representation comprises an edge between two concepts when the two concepts are related, but the context intersection graph comprises an edge between two nodes only when the semantic contexts of the concepts representing the two nodes intersect.

The similarities calculations shown in the above pseudo-code example may be applied and incorporated into the context intersection graph construction. For every similarity score greater than zero, an undirected edge and two nodes may be added to the graph, as shown in the following exemplary but non-limiting pseudo-code algorithm that carries for the terminology laid out above.

Pseudo-Code for Building the Context Intersection Graph

```
for i = 1 to N do
    for j = i + 1 to N do
        for t = 1 to N_li do
            for q = 1 to N_lj do
                similarity = SemanticIntersection(Context_li^t,Context_lj^q)
                if similarity > 0 then
                    addNode(G,Concept_li^t)
                    addNode(G,Concept_lj^q)
                    addEdge(G,Concept_li^t,Concept_lj^q,similarity)
                end if
            end for
        end for
    end for
end for
```

After a context intersection graph is generated at act 506, process 500 proceeds to act 508, where the context intersection graph generated at act 506 is used to calculate a score for each of one or more concepts in the context intersection graph. Aspects of calculating a score for concepts in the context intersection graph are described below and illustrated with associated pseudo-code examples.

In some embodiments, a score for a concept (i.e., a score for a node representing the concept) may be calculated based at least in part on an initial score assigned to the node, scores (initial or otherwise) assigned to nodes adjacent to the node in the context intersection graph, and/or weights of edges incident to the node.

In some embodiments, an initial score may be assigned to a node in the context intersection graph based on a measure of dominance or typicality of the concept represented by the node. Among a set of concepts having the same label, the dominant concept is the concept associated with the more dominant or typical meaning of the label, when taken out of context. A measure of dominance of a concept associated with a particular meaning is indicative of how dominant or typical that meaning is. For example, the label "brain" is more likely to mean a body organ than a name of a movie. As another example, concept "IBM" (as in the computer company International Business Machines) is more likely to be dominant than a concept "IBM" (as in the Intercontinental Ballistic Missile) because, without any other context, most people would understand IBM to refer to the company.

The measure of dominance of a concept in a knowledge representation may be obtained in any suitable way. In some embodiments, the measure of dominance of a concept having a particular label may be obtained at least in part by analyzing one or more external corpora. For example, the corpora may be analyzed to determine how often each meaning of a particular label appears in the corpora.

In some embodiments, the measure of dominance of a concept may be obtained at least in part by analyzing the graph of the knowledge representation that includes the concept and by analyzing one or more external corpora. For example, the corpora may be analyzed to determine how often each meaning of a particular label co-occurs with the label of a neighboring (or otherwise related) concept in the graph of the knowledge representation.

In some embodiments, the measure of dominance of a concept may be obtained by analyzing the graph of the knowledge representation. For example, each concept in a group of concepts having the same label may be assigned a dominance score based on how connected the corresponding node is to other nodes in the graph. A high degree of connectivity of a node may be indicative of a large number of relationships between the concept represented by the node and other concepts, which in turn may be indicative of the dominance of the concept represented by the node relative to other concepts having the same label, but fewer connections to other nodes. Accordingly, in some embodiments, a measure of dominance for a concept may be computed based at least in part on the degree (e.g., in-degree of the node, out-degree of the node, both in-degree and out-degree) of the node representing the concept in the KR graph. For example, the degree for each of multiple nodes representing concepts having the same label may be obtained by analyzing the KR graph and used to obtain a measure of dominance for each of the concepts.

Accordingly, at act 508, the score for a concept in the context intersection graph may be calculated based at least in part on a measure of dominance of that concept as represented by an initial score assigned to the node representing the concept. Moreover, the score for a concept may be calculated based at least in part on weights of edges connected the node representing the concept to other nodes in the context intersection graph. As such, the score for a concept may be calculated based on a measure of semantic coherence between pairs of concepts in the context intersection graph.

In some embodiments, the initial scores of nodes in the context intersection graph and weights assigned to edges in the context intersection graph may be used to calculate a score for each of one or more nodes in the context intersection graph using the iterative process illustrated with the following pseudo-code algorithm that terminates after a predetermined number of iterations or the max difference in scores ("maxDiff") is below a predetermined threshold:

Pseudo-Code for Ranking Concepts in Context Intersection Graph

```
previousScores = priors
for maxIterations or until maxDiff < threshold
  maxDiff = 0
  foreach Node in G
    currentScore_node = 0.0
    foreach Edge attached to Node
      adjacentNode = getAdjacentNode(G,Node,Edge)
      currentScore_node = (currentScore_node + getImportance(adjacentNode,Edge))
    end foreach
    currentScore_node = (currentScorenode * dampingFactor) +
    ((1 - dampingFactor) * prior_node))
    maxDiff - max(maxDiff,| currentScore_node - previousScore_node|))
  end foreach
  previousScores = currentScores
end for
```

$$\text{getImportance(node, edge)} = \frac{\text{previousScore}_{node} * \text{getEdgeWeight(G, edge)}}{\text{getWeightedDegree(G, node)}}$$

Note in the above pseudo-code algorithms that the number of iterations ("maxIterations"), damping factors ("dampingFactor") and threshold-level ("threshold") are parameters that may be set by a user to achieve the desired performance-speed trade-offs sought for the system.

Figure 7:
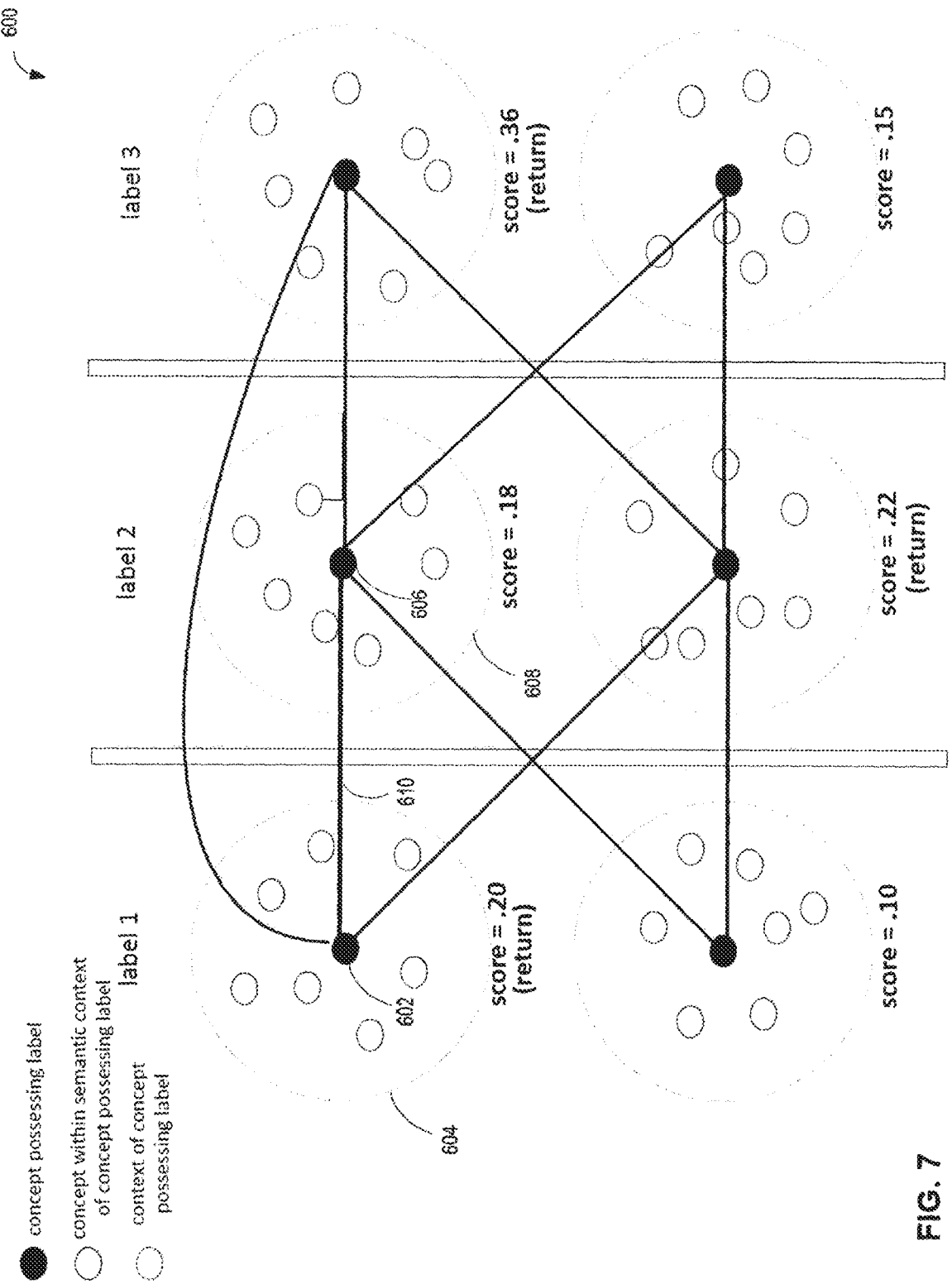
FIG. 7 shows scores computed concepts in the context intersection graph shown in FIG. 6, in accordance with some embodiments.

FIG. 7 illustrates scores calculated for the concepts in the context intersection graph 600 using the iterative process exemplified in the above pseudo-code algorithms. FIG. 9 illustrates scores calculated for each concept in the context intersection graph 800 (shown in FIG. 8) at each iteration of the process may be achieved by applying the above pseudo-code algorithms.

After scores for concepts in a context intersection graph are calculated at act 508, process 500 proceeds to act 510, where a concept associated with the meaning for each portion of the user context information obtained at act 502 is identified based on the scores. When a portion of the UCI is associated with multiple concepts having the same label (e.g., "Apple" as in fruit, "Apple" as in computer company, etc.), the concept having the highest score computed at act 508 may be selected. After a concept is selected for each portion of the user context information at act 510, process 500 completes.

VI. Provide Information to User(s) Based on Identified Concepts

As previously described, after a knowledge representation has been updated, at act 208, process 200 proceeds to act 210, where content may be provided to one or more users. Such content may be selected from a large set of content by using the concept(s) identified at act 206, any concepts added to the knowledge representation at act 208, and/or any concepts in the knowledge representation related to the identified concepts.

In some embodiments, user context information obtained at act 202 may comprise a user request for information the user may be seeking. Such a request may have any suitable form and, for example, may comprise a search query and/or one or more settings indicating the type of information that the user wishes to receive (e.g., news updates related to a certain topic or topics, advertisements relating to one or more types of product(s), newsletters, e-mail digests, etc.). One or more concepts associated with a meaning of the user request may be identified at act 206 and, optionally along with any other concepts in the knowledge representation related to the identified concepts, may be used to select content from a large set of content for presentation to the user.

As one illustrative example, the user's request may comprise a search query and the concept(s) identified at act 206 as associated with a meaning of the search query (optionally, along with any other related concepts in the knowledge representation) may be used to determine what information to search for and/or how to present the obtained search results to the user.

In some embodiments, a user's search query and the identified and/or related concept(s) may be used to generate at least one new search query to be provided to one or more search services. This may be done in any suitable way. For example, a new search query may be constructed from the labels of identified and/or related concept(s) by augmenting the search query with one or more labels associated with these concepts. A search query may be formed by joining the labels of these concepts by using various Boolean operators such as "AND" and "OR." For example, if the user provides a search query "Apple Desktop," labels of the concepts "Apple," "Desktop" as well as the labels of the related concepts "Computer" and "iMAC" may be used to construct an augmented search query "Apple Desktop Computer AND iMAC."

The augmented search query may then be issued to one or more search services. In response to issuing the one or more search queries to the search service, a set of search results may be received from the search service and presented to the user. A search service may be any general-purpose search engine. For instance, the search service may be any search engine publicly accessible via the Internet. As another example, the search service may be a search engine accessible via any computer network other than the Internet such as search engines used for searching a corporate Intranet or any other private network.

In some embodiments, the concept(s) identified as associated with a meaning of the search query and, optionally, any concepts in the knowledge representation related to the identified concept(s), may be used to filter and/or rank search results obtained in response to a user's query based on how closely the contents of the search results match these concepts. This may allow for the provisioning of content to users without overwhelming the users with information irrelevant to them.

Any of a variety of possible ranking or filtering techniques may be used, as aspects of the disclosure provided herein are not limited in this respect. Search services may provide a number of textual features in their search results: titles, abstracts, descriptions, tags, hyperlinks, etc. These textual features may provide for text analysis as a means to filter the search engine results against the concepts identified at act 206, for example, by comparing the concept labels against words in the textual features of the search engine results. Whole or partial matches of concept labels may be used to weight the relevance of the individual results. In some embodiments, the search results returned from the search service may not include the identified pieces of content themselves, but rather may include a list of hyperlinks to these pieces of content along with an excerpt of each piece of content. In such embodiments, rather than retrieving each piece of content using the provided hyperlink, the list of hyperlinks may be filtered and ranked using the associated excerpt, and the excerpt may be semantically annotated.

It should be appreciated that user context information is not limited to being a user-specified search query and may comprise any other suitable information that may indicate the type of information the user is seeking. For example, user context information may comprise the user's demographic information, the user's Internet browsing history, any information associated with the user on a website such as a social networking website, geo-spatial information may comprise the current location of the user's computing device, etc.

Accordingly, one or more concepts associated with a meaning of this information may be identified in the knowledge representation and used to select content from a large set of content to present to the user. For example, a user may use an online information source (e.g., Internet portal, news website, social networking website, real-time feed, blog, etc.) to obtain information. The online information source may be configured to present the user with information selected, based on the concepts identified in the knowledge representation in accordance with the above-described embodiments, from among a large set of information the online information source may present to the user. In this way, when the user uses the online information source, the user may not be overwhelmed with irrelevant content. This may be done in any suitable way. For example, the identified concepts may be used to rank, prioritize, and/or filter the information that may be presented to a user. For example, information that an online information source is configured to present to a user may comprise one or more textual features (e.g., tags, text, hyperlinks, descriptions, etc.). These textual features may be compared to labels of the concepts identified at act 206. Whole or partial matches between the textual features and concept labels may be used to weight the textual features. As another example, the online information source may present the user with personalized product and service recommendations based on the concepts identified in the knowledge representation. The personalized recommendations may include promotional content such as advertisements for products and/or services.

VII. Additional Implementation Detail

Figure 10:
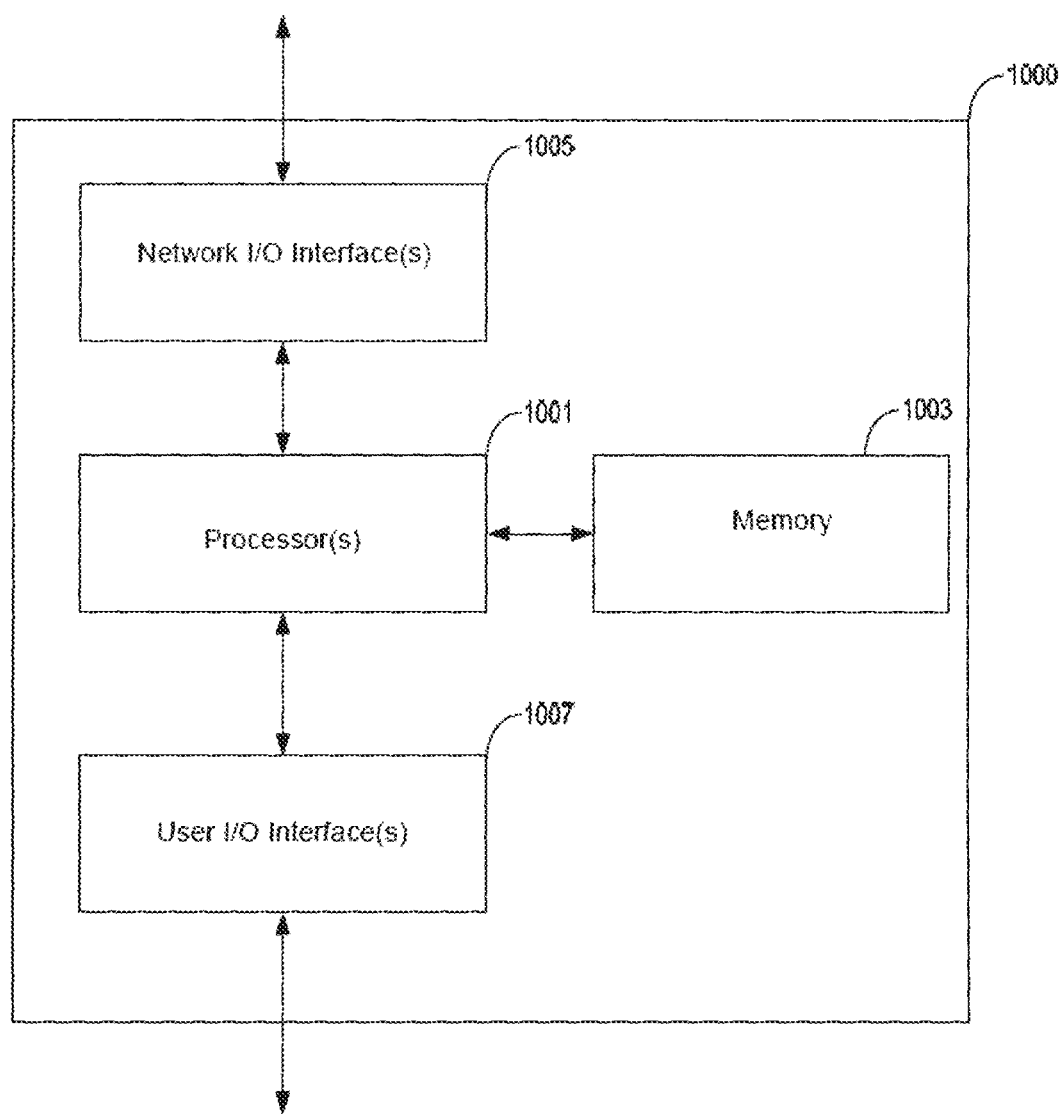
FIG. 10 is a block diagram of a computing device on which some embodiments of the present disclosure may be implemented.

The above-discussed computing devices (e.g., client computer and server shown in FIG. 3) may be implemented in any of a variety of ways. FIG. 10 is a block diagram an illustrative computing device 1000 that may be used to implement any of the above-discussed computing devices.

The computing device 1000 may include one or more processors (e.g., microprocessors) 1001 and one or more tangible, non-transitory computer-readable storage media (e.g., memory 1003). Memory 1003 may store, in tangible non-transitory computer-readable storage media computer instructions that implement any of the above-described functionality. Processor(s) 1001 may be coupled to memory 1003 and may execute such computer instructions to cause the functionality to be realized and performed. Computing device 1000 may also include a network input/output (I/O) interface 1005 via which the computing device may communicate with other computers (e.g., over a network). In some embodiments, the computing device may also include one or more user I/O interfaces, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code may be embodied as stored program instructions that may be executed on any suitable processor or collection of hardware processors (e.g., a microprocessor or microprocessors), whether provided in a single computer or distributed among multiple computers.

It should be appreciated that a computer may be embodied in any of numerous forms, such as a rack-mounted computer, a desktop computer, a laptop computer, or a tablet computer. Additionally, a computer may be embodied in a device not generally regarded as a computer, but with suitable processing capabilities, including a Personal Digital Assistant (PDA), a smart phone, a tablet, a reader, or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including networks such as a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory tangible computer-readable storage medium (e.g., a computer memory, one or more floppy discs, compact discs, optical discs, magnetic tapes, flash memories, circuit configurations in Field Programmable Gate Arrays or other semiconductor devices, etc.) article(s) encoded with one or more programs that, when executed on one or more computers or other processors, implement the various process embodiments of the present invention. The non-transitory computer-readable medium or media may be transportable, such that the program or programs stored thereon may be loaded onto any suitable computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, items, components, data structures, etc. that perform particular tasks or implement particular abstract data types. Typically the functionality of the program modules may be combined or distributed as desired in various embodiments.

Also, data structures may be stored in non-transitory tangible computer-readable storage media articles in any suitable form. For simplicity of illustration, data structures may be shown to have fields that are related through location in the data structure. Such relationships may likewise be achieved by assigning storage for the fields with locations in a non-transitory tangible computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which multiple examples have been provided (e.g., processes 200, 400, and 500). The acts performed as part of the method may be ordered in any suitable way. Accordingly, embodiments may be constructed in which acts are performed in an order different than illustrated, which may include performing some acts simultaneously, even though shown as sequential acts in illustrative embodiments, or vice versa.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications, and improvements will readily occur to those skilled in the art. Such modifications and improvements are intended to be within the spirit and scope of the invention. Accordingly, the foregoing description is by way of example only, and is not intended as limiting.

The invention claimed is:

1. A method comprising:
   obtaining user context information associated with a user, wherein the user context information comprises a first portion and a second portion different from the first portion, wherein the user context information comprises text, wherein the first portion comprises at least a first word in the text, and wherein the second portion comprises a remainder of the words in the text not included in said first portion; and
   identifying a first concept associated with a meaning of the first portion from a first group of concepts in a knowledge representation (KR), wherein each concept in the first group of concepts is associated with a different meaning of the first portion,
   wherein the identifying is performed at least in part by using at least one processor, and said identifying is based on a graph of the knowledge representation, and the second portion,
   wherein the identifying the first concept comprises calculating a measure of semantic coherence between the first concept and a second concept associate with a meaning of the second portion from a second group of concepts in the KR by using the graph of the KR, and
   wherein calculating the measure of semantic coherence between the first concept and the second concept comprises:
      identifying a first semantic context of the first concept in the KR, wherein the first semantic context is defined as a number of concepts in the first group of concepts which are within a predetermined distance of said first concept in said KR;
      identifying a second semantic context of the second concept in the KR, wherein the second semantic context is defined as a number of concepts in the second group of concepts which are within a predetermined distance of the second concept in said KR; and
      calculating the measure of semantic coherence based on whether said first semantic context intersects with said second semantic context, wherein said first semantic context intersects with said second semantic context when said first semantic context and said second semantic context share at least a predetermined number of concepts.

2. The method of claim 1, further comprising:
   identifying the second concept associated with the meaning of the second portion from a second group of concepts in the KR, wherein each concept in the second group of concepts is associated with a different meaning of the second portion.

3. The method of claim 1, further comprising:
   constructing a context intersection graph using the graph of the KR;
   calculating a score for each concept in the first group of concepts at least in part by using the context intersection graph; and
   identifying the first concept as a concept in the first group of concepts having the highest score.

4. The method of claim 3, wherein the context intersection graph comprises a plurality of nodes including a first node for the first concept and a second node for the second concept, and wherein constructing the context intersection graph comprises:
   when the measure of semantic coherence between the first concept and the second concept is above a threshold, adding an edge between the first node and the second node to the context intersection graph, wherein the edge has a weight equal to the measure of semantic coherence.

5. The method of claim 3, wherein the score for the first concept is calculated based at least in part on a measure of dominance of the first concept.

6. The method of claim 5, wherein the score for the first concept is further calculated based on at least one weight of at least one edge incident to a first node for the first concept in the context intersection graph.

7. The method of claim 1, wherein the knowledge representation is a semantic network represented by a data structure embodying a directed graph comprising a plurality of nodes and a plurality of edges, wherein each node is associated with a concept in the knowledge representation and an edge between two nodes represents a relationship between concepts associated with the two nodes.

8. The method of claim 1, wherein the user context information comprises at least one of a search query provided by the user, demographic information about the user, information from the user's browsing history, information typed by the user, and/or information highlighted by the user.

9. The method of claim 1, wherein the user context information comprises a search query provided by a user.

10. The method of claim 1, further comprising:
providing output information to the user, wherein the output information is obtained by using the identified first concept.

11. The method of claim 10, wherein the output information comprises one or more advertisements and/or one or more product recommendations.

12. The method of claim 10, wherein the output information comprises content accessible through a website.

13. A system comprising:
at least one processor configured to perform:
obtaining user context information associated with a user, wherein the user context information comprises a first portion and a second portion different from the first portion, wherein the user context information comprises text, wherein the first portion comprises at least a first word in the text, and wherein the second portion comprises a remainder of the words in the text not included in said first portion; and
identifying a first concept associated with a meaning of the first portion from a first group of concepts in a knowledge representation (KR), wherein each concept in the first group of concepts is associated with a different meaning of the first portion,
wherein the identifying is performed at least in part by using a graph of the knowledge representation and the second portion,
wherein the identifying the first concept comprises calculating a measure of semantic coherence between the first concept and a second concept associate with a meaning of the second portion from a second group of concepts in the KR by using the graph of the KR, and
wherein calculating the measure of semantic coherence between the first concept and the second concept comprises:
identifying a first semantic context of the first concept in the KR, wherein the first semantic context is defined as a number of concepts in the first croup of concepts which are within a predetermined distance of said first concept in said KR;
identifying a second semantic context of the second concept in the KR, wherein the second semantic context is defined as a number of concepts in the second croup of concepts which are within a predetermined distance of the second concept in said KR; and
calculating the measure of semantic coherence based on whether said first semantic context intersects with said second semantic context, wherein said first semantic context intersects with said second semantic context when said first semantic context and said second semantic context share at least a predetermined number of concepts.

14. At least one non-transitory computer-readable storage medium storing processor executable instructions that, when executed by at least one processor, cause the at least one processor to perform a method comprising:
obtaining user context information associated with a user, wherein the user context information comprises a first portion and a second portion different from the first portion, wherein the user context information comprises text, wherein the first portion comprises at least a first word in the text, and wherein the second portion comprises a remainder of the words in the text not included in said first portion; and
identifying a first concept associated with a meaning of the first portion from a first group of concepts in a knowledge representation (KR), wherein each concept in the first group of concepts is associated with a different meaning of the first portion,
wherein the identifying is performed at least in part by using a graph of the knowledge representation, and the second portion,
wherein the identifying the first concept comprises calculating a measure of semantic coherence between the first concept and a second concept associate with a meaning of the second portion from a second group of concepts in the KR by using the graph of the KR, and
wherein calculating the measure of semantic coherence between the first concept and the second concept comprises:
identifying a first semantic context of the first concept in the KR, wherein the first semantic context is defined as a number of concepts in the first group of concepts which are within a predetermined distance of said first concept in said KR;
identifying a second semantic context of the second concept in the KR, wherein the second semantic context is defined as a number of concepts in the second group of concepts which are within a predetermined distance of the second concept in said KR; and
calculating the measure of semantic coherence based on whether said first semantic context intersects with said second semantic context, wherein said first semantic context intersects with said second semantic context when said first semantic context and said second semantic context share at least a predetermined number of concepts.

15. A method comprising:
obtaining user context information associated with a user, wherein the user context information comprises a first portion and a second portion different from the first portion, wherein the user context information comprises text, wherein the first portion comprises at least a first word in the text, and wherein the second portion comprises a remainder of the words in the text not included in said first portion; and
disambiguating between a first concept in a knowledge representation (KR) associated with a first meaning of the first portion and a second concept in the KR associated with a second meaning of the first portion,
wherein the disambiguating is performed at least in part by using at least one processor, a graph of the knowledge representation, and the second portion,
wherein the identifying the first concept comprises calculating a measure of semantic coherence between the first concept and a second concept associate with a meaning of the second portion from a second group of concepts in the KR by using the graph of the KR, and
wherein calculating the measure of semantic coherence between the first concept and the second concept comprises:
identifying a first semantic context of the first concept in the KR, wherein the first semantic context is defined as a number of concepts in the first group of concepts which are within a predetermined distance of said first concept in said KR;

identifying a second semantic context of the second concept in the KR, wherein the second semantic context is defined as a number of concepts in the second croup of concepts which are within a predetermined distance of the second concept in said KR; and calculating the measure of semantic coherence based on whether said first semantic context intersects with said second semantic context, wherein said first semantic context intersects with said second semantic context when said first semantic context and said second semantic context share at least a predetermined number of concepts.

16. A system comprising:
at least one processor configured to perform:
obtaining user context information associated with a user, wherein the user context information comprises a first portion and a second portion different from the first portion, wherein the user context information comprises text, wherein the first portion comprises at least a first word in the text, and wherein the second portion comprises a remainder of the words in the text not included in said first portion; and disambiguating between a first concept in a knowledge representation (KR) associated with a first meaning of the first portion and a second concept in the KR associated with a second meaning of the first portion, wherein the disambiguating is performed at least in part by using a graph of the knowledge representation and the second portion, wherein the identifying the first concept comprises calculating a measure of semantic coherence between the first concept and a second concept associate with a meaning of the second portion from a second group of concepts in the KR by using the graph of the KR, and wherein calculating the measure of semantic coherence between the first concept and the second concept comprises:
identifying a first semantic context of the first concept in the KR, wherein the first semantic context is defined as a number of concepts in the first croup of concepts which are within a predetermined distance of said first concept in said KR;

identifying a second semantic context of the second concept in the KR, wherein the second semantic context is defined as a number of concepts in the second croup of concepts which are within a predetermined distance of the second concept in said KR; and calculating the measure of semantic coherence based on whether said first semantic context intersects with said second semantic context, wherein said first semantic context intersects with said second semantic context when said first semantic context and said second semantic context share at least a predetermined number of concepts.

17. At least one non-transitory computer-readable storage medium storing processor executable instructions that, when executed by at least one processor, cause the at least one processor to perform a method comprising:
obtaining user context information associated with a user, wherein the user context information comprises a first portion and a second portion different from the first portion, wherein the user context information comprises text, wherein the first portion comprises at least a first word in the text, and wherein the second portion comprises a remainder of the words in the text not included in said first portion; and disambiguating between a first concept in a knowledge representation (KR) associated with a first meaning of the first portion and a second concept in the KR associated with a second meaning of the first portion, wherein the disambiguating is performed at least in part by using a graph of the knowledge representation and the second portion, wherein the identifying the first concept comprises calculating a measure of semantic coherence between the first concept and a second concept associate with a meaning of the second portion from a second group of concepts in the KR by using the graph of the KR, and wherein calculating the measure of semantic coherence between the first concept and the second concept comprises:
identifying a first semantic context of the first concept in the KR, wherein the first semantic context is defined as a number of concepts in the first croup of concepts which are within a predetermined distance of said first concept in said KR;

identifying a second semantic context of the second concept in the KR, wherein the second semantic context is defined as a number of concepts in the second croup of concepts which are within a predetermined distance of the second concept in said KR; and calculating the measure of semantic coherence based on whether said first semantic context intersects with said second semantic context, wherein said first semantic context intersects with said second semantic context when said first semantic context and said second semantic context share at least a predetermined number of concepts.

* * * * *